US012381784B1

(12) United States Patent
Samuel et al.

(10) Patent No.: US 12,381,784 B1
(45) Date of Patent: Aug. 5, 2025

(54) SYSTEM AND METHOD FOR INTELLIGENT TRANSFERENCE OF PERIPHERAL DEVICE OPERATIONAL CONFIGURATIONS ACROSS PERIPHERAL DEVICE WORKSPACES BASED ON SHARED USAGE PATTERNS

(71) Applicant: Dell Products, LP, Round Rock, TX (US)

(72) Inventors: Balasingh P. Samuel, Round Rock, TX (US); Gandali Patil, San Antonio, TX (US); FNU Jasleen, Austin, TX (US); Vivek Viswanathan Iyer, Saint Johns, FL (US)

(73) Assignee: DELL PRODUCTS LP, Round Rock, TX (US)

( * ) Notice: Subject to any disclaimer, the term of this patent is extended or adjusted under 35 U.S.C. 154(b) by 3 days.

(21) Appl. No.: 18/430,533

(22) Filed: Feb. 1, 2024

(51) Int. Cl.
*H04L 41/08* (2022.01)
*G06F 18/231* (2023.01)
*H04L 41/084* (2022.01)

(52) U.S. Cl.
CPC ...... *H04L 41/0886* (2013.01); *H04L 41/0846* (2013.01); *G06F 18/231* (2023.01)

(58) Field of Classification Search
CPC ............. H04L 41/0886; H04L 41/0846; G06F 18/231
See application file for complete search history.

(56) References Cited

U.S. PATENT DOCUMENTS

| | | |
|---|---|---|
| 8,510,255 B2 | 8/2013 | Fadell |
| 9,003,311 B2 | 4/2015 | Reeves |
| 9,036,509 B1 | 5/2015 | Addepalli |
| 10,057,131 B1 | 8/2018 | Brown |
| 10,606,725 B2 | 3/2020 | Hanson |

(Continued)

OTHER PUBLICATIONS

Smedlund et al, "Platform Orchestration for Efficiency, Development, and Innovation", 2015 48th Hawaii International Conference on System Sciences, Jan. 5, 2015, IEEE Publishing.*

(Continued)

*Primary Examiner* — Todd L Barker
(74) *Attorney, Agent, or Firm* — Prol Intellectual Property Law, PLLC; H. Kenneth Prol

(57) ABSTRACT

A peripheral device workspace cloud orchestrator executing at a cloud-based information handling system comprises a hardware processor to execute code instructions to determine a usage category from operational telemetry data for a current peripheral device workspace having an anchor node and current peripheral devices operatively coupled at a location, the usage category defined by a previous peripheral device operational telemetry data, previous manifest of previous peripheral devices within a previous peripheral device workspace, and at least one previous functional capability and previous adjustable operational configuration of a previous peripheral device. The hardware processor to determine a functional capability for a current peripheral device sufficiently matches the previous functional capability for the usage category and instructs the anchor node to automatically configure the current peripheral device according to the previous adjustable operational configuration in that usage category.

20 Claims, 5 Drawing Sheets

(56) References Cited

U.S. PATENT DOCUMENTS

| | | | |
|---|---|---|---|
| 11,321,247 | B2 | 5/2022 | Bshara |
| 11,381,461 | B1* | 7/2022 | Raymond ........... G06F 11/3051 |
| 11,393,036 | B2 | 7/2022 | Wang |
| 2019/0179645 | A1 | 6/2019 | Prasad |
| 2020/0015300 | A1 | 1/2020 | Suumaki |
| 2022/0179958 | A1* | 6/2022 | Robison .................. G06F 21/57 |
| 2023/0039612 | A1* | 2/2023 | Hamlin ................... G06F 1/325 |
| 2023/0252484 | A1* | 8/2023 | Crouse ............. G06Q 10/06315 |
| | | | 705/304 |
| 2024/0428104 | A1* | 12/2024 | Werner .................. G06N 20/00 |
| 2025/0097821 | A1* | 3/2025 | Akkipeddi ............ H04L 45/741 |

OTHER PUBLICATIONS

Costa et al, "Orchestration in Fog Commuting: A Comprehensive Survey", , ACM Computing Surveys, Jan. 18, 2022, ACM Publishing.*

Velasquez et al, "Fog Orchestration for the Internet of EverythingL state-of-the-art and research challenges", Jul. 2018.*

\* cited by examiner

180
SYSTEM AND METHOD FOR INTELLIGENT TRANSFERENCE OF PERIPHERAL DEVICE OPERATIONAL CONFIGURATIONS ACROSS PERIPHERAL DEVICE WORKSPACES BASED ON SHARED USAGE PATTERNS

FIELD OF THE DISCLOSURE

The present disclosure generally relates to automatic assessment or configuration of peripheral devices for use in a user peripheral device workspace. The present disclosure more specifically relates to assessment or automated and recommended setup and updating of configurations for peripheral device nodes of a current peripheral device workspace, either internal or external to an information handling system node, based on functionality and configurations for other peripheral device nodes in use in other peripheral device workspaces having a usage pattern that matches that of the current peripheral device workspace.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output devices such as a keyboard, mouse, touchpad, gaming controller, display device, wearable peripheral device, speakers, earbud, headphone, microphone, stylus, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
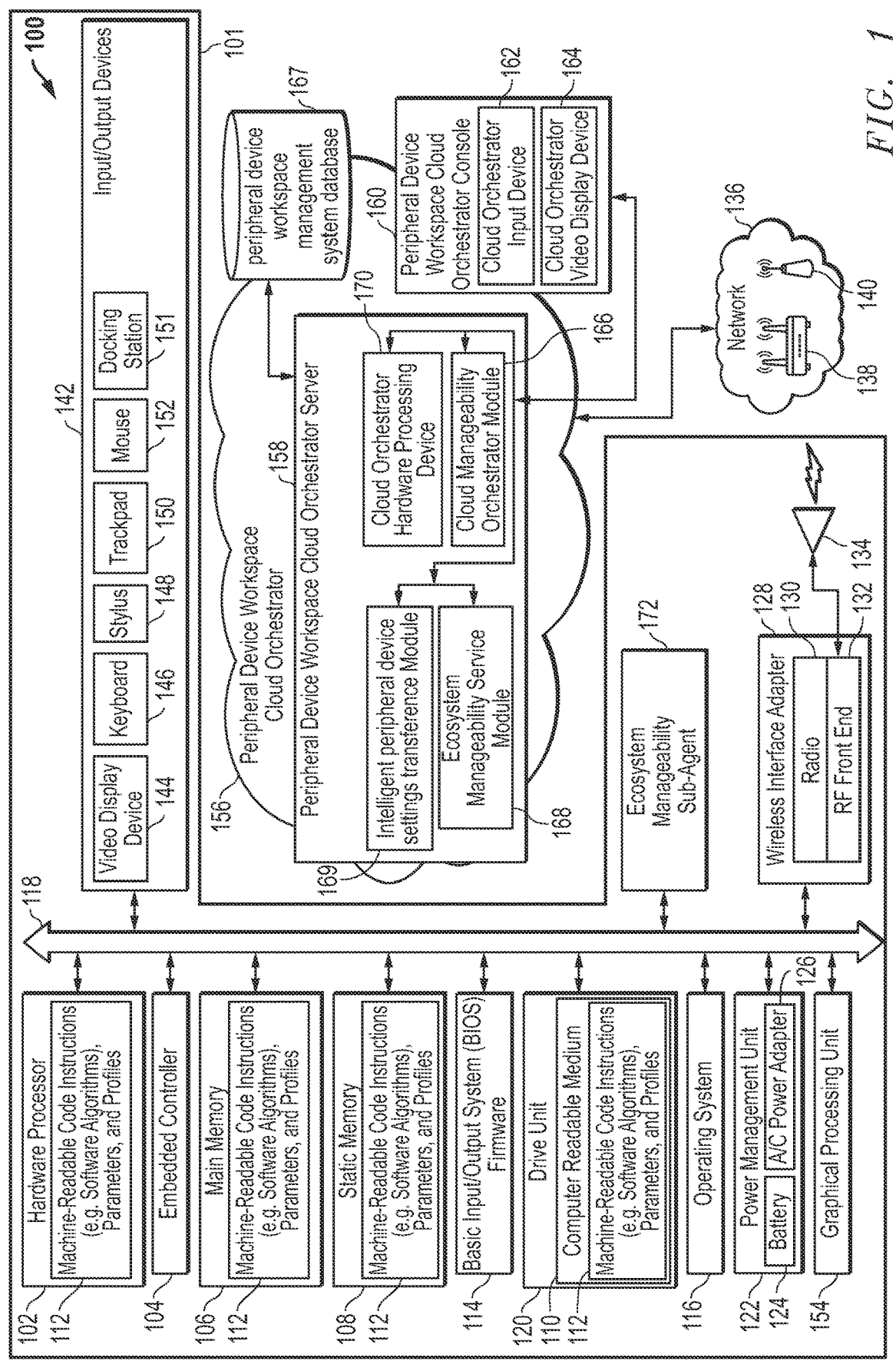
FIG. 1 is a block diagram illustrating a cloud-based information handling system executing code instructions of a peripheral device workspace cloud orchestrator including code instructions of an intelligent peripheral device setting transference module to orchestrate configuration of peripheral device nodes across a plurality of user peripheral device workspaces according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A user may oftentimes use an information handling system in a peripheral device workspace. In this context, a peripheral device workspace can be viewed as an environment that includes a user information handling system (e.g., a laptop) operating as an anchor node for the peripheral device workspace and peripheral devices operating as secondary nodes of the peripheral device workspace that are connected to the user information handling system. A set of environmental context data for a peripheral device workspace may include, for example, location, time of day, applications being executed, wireless or wired connection capabilities, or security credentials for the user. Peripheral device nodes may commonly include internal or external devices such as displays, a keyboard, a mouse, a webcam, a printer, a speaker, a fingerprint scanner, etc. In various embodiments, a peripheral device workspace may include a wired or wireless dock by which the user information handling system node connects to some or all the peripheral device nodes including smart peripheral device nodes having some compute or input/output capabilities.

A peripheral device workspace, in various embodiments, be used for hybrid work scenarios. For example, a business may have an office space that includes hoteling cubes that can be assigned to, reserved by, or otherwise utilized by the business's employees as peripheral device workspaces. In such cases, the business may allow its employees to connect their laptops to a dock in a particular hoteling cube where various peripherals may be available for use. In other embodiments, a business may have collaborative peripheral device workspace such as for a conference room or a meeting room. Users may also employ peripheral device workspaces when working from home or other locations.

When a user employs multiple peripheral device workspaces (e.g., by connecting a laptop to different combinations of peripheral devices during a workday), it can be tedious for the user to configure the peripheral device workspaces to his or her preferences. For example, while using one peripheral device workspace, the user may set configurations for the peripheral devices of the peripheral device workspace to match the user's preferences. If the user switches to a different peripheral device workspace, those configurations may not be consistent with the peripheral devices of the different peripheral device workspace or may result in unintended changes. The user may therefore have to manually reconfigure the peripheral devices within the peripheral device workspace.

As one particular example, a user may have a home peripheral device workspace that includes a 4K monitor peripheral device with 3840×2160 resolution at 60 Hz that is in landscape orientation and that also includes a 32-inch Full High Definition (FHD) monitor with 1920×1080 resolution that is in portrait orientation. This user may have set adjustable operational configurations for this home peripheral device workspace to personalize these display devices. The user may also have access to multiple office peripheral device workspaces (e.g., in a hoteling scenario), and these peripheral device workspaces may have different sets of peripheral device nodes such as a first office peripheral device workspace with two display devices and a second office peripheral device workspace with a single display device or a conference room. If the user's adjustable operational configurations for the home peripheral device workspace are applied to the office peripheral device workspaces, the display device(s) will likely not be configured in accordance with the user's preferences. The user will then need to manually reconfigure the office peripheral device workspace to achieve her preferences. When the user returns to her home peripheral device workspace, she may again be required to manually reconfigure the home peripheral device workspace. As can be seen, when using multiple peripheral device workspaces, personalized adjustable operational configurations for peripheral device nodes are likely to be lost or misapplied due to the mismatching set of peripheral devices that make up the peripheral device workspaces. These issues arise in cases where the user switches between entirely different peripheral device workspaces (e.g., when leaving home where a home peripheral device workspace is used to travel to work where an office peripheral device workspace is used) as well as in cases where the user creates a different peripheral device workspace through the connection and/or disconnection of a peripheral device node (e.g., when connecting an external webcam to a dock or laptop that is part of an existing peripheral device workspace).

Execution of code instructions for an ecosystem manageability sub-agent on a user information handling system monitor for set of environmental context data of a peripheral device workspace, such as time, location, applications currently executing or planned, connection type (e.g., wireless, wired, wireless wide area network (WWAN), wireless local area network (WLAN), wireless private area network (WPAN)), security credentials for the user, or environmental sensor readings (e.g., humidity, temperature), among other possible operational telemetry data readings for the information handling system. These peripheral device operational telemetry data readings may be gathered routinely, or upon each startup of an information handling system node in a peripheral device workspace, for example. Further, the ecosystem manageability sub-agent executing at the information handling system may create a manifest of peripheral device nodes at a location to represent the current peripheral device workspace, including an identification of the user, an identification (e.g., by Media Access Control (MAC) address) of each of the peripheral device nodes connected to or operably coupled to the information handling system nodes, one or more environmental context data features (e.g., time, location, applications executing, etc.), one or more ranges of peripheral device functional capabilities, and one or more adjustable operational configurations (e.g., resolution for an external display device) within a range of peripheral device functional capabilities for the operably coupled peripheral device nodes.

Peripheral device workspaces may be associated with a peripheral device workspace identification value and include a location identifier and a manifest of peripheral device nodes or other nodes, such as anchor node information handling system or systems or smart nodes which is stored in a peripheral device workspace cloud orchestrator server database, peripheral device workspace management system database, or similar cloud based database in embodiments herein. Such a manifest may be written in a machine-readable language or machine markup language such as JavaScript Object Notation (JSON), for example, and transmitted for storage at the peripheral device workspace management system database associated with a peripheral device workspace cloud orchestrator operating in a cloud computing platform. The peripheral device workspace identification value for a peripheral device workspace may also have associated with it additional information such as the peripheral device operational telemetry data readings described above or contextual data about the operational capabilities and settings of nodes, including peripheral device nodes, smart peripheral device nodes, and anchor information handling system nodes in particular peripheral device workspaces. Each time a peripheral device adjustable operational configuration is changed by the user, a user joins a different peripheral device workspace, a new peripheral device node is added to the peripheral device workspace, or a new change to environmental context data is detected, an updated or new manifest including this updated adjustable operational configuration, context information, or new peripheral device node registration may be transmitted to a peripheral device workspace cloud orchestrator executing at a cloud platform server or servers.

Various peripheral device workspaces such as the hybrid work office peripheral device workspaces, collaborative peripheral device workspaces, and other peripheral device workspaces described herein may be defined by location indicator detected for an anchor node information handling system operating at the peripheral device workspace, and a manifest of nodes of peripheral devices and smart devices that may operate in the peripheral device workspace. As described, each such defined peripheral device workspace may also be assigned a peripheral device workspace identification value which may be stored and associated with stored manifests of nodes operating in the peripheral device workspace at the peripheral device management system database, peripheral device workspace cloud orchestrator server database, or similar remote database. Additional peripheral device operational telemetry data readings for the peripheral device workspace may be stored within one or more peripheral device workspace anchor node status update documents as well as included in the definition of the peripheral device workspace and associated with its peripheral device workspace identification value defined at the peripheral device workspace cloud orchestrator server database, including peripheral device capabilities, peripheral device connectivity details, current peripheral device configurations or settings, peripheral device setting or configuration options, current status of the peripheral device nodes within the peripheral device workspace, and other features of nodes within the peripheral device workspace. For example, the definition of the peripheral device workspace associated with a specific peripheral device workspace identification value may include a set of peripheral device operational telemetry data readings stored within one or more peripheral device workspace anchor node status update documents, such as time, applications currently executing or planned, connection type, hardware component capabilities or usage metrics, or environmental sensor readings (e.g., humidity, temperature), among other possible environmental context telemetry data readings for an anchor node information handling system operating within the defined peripheral device workspace.

A peripheral device workspace may be defined by a location identifier (e.g., location in a wireless or wired network, global positioning, or other with association with a physical location), a list of peripheral device nodes operatively coupled to an anchor node information handling system for a user, type of peripheral device workspace (e.g., personal, hoteling office/shared, or collaborative), and additionally in some cases, by one or more of the peripheral device operational telemetry data readings for the peripheral device workspace described herein. Each of these defining factors may be associated in memory for the peripheral device workspace management system with the peripheral device workspace identification value, which may also be associated with one or more peripheral device operational configuration policies describing how the peripheral device nodes within the defined peripheral device workspace are to operate. Thus, a particular peripheral device operational configuration policy for one or more peripheral devices within a given peripheral device workspace having a peripheral device workspace identification value may apply only when certain peripheral device operational telemetry data readings, such as telemetries describing usage patterns for those peripheral devices are detected. In such a way, the peripheral device operational configuration policy for a peripheral device node within a peripheral device workspace may be defined or associated with particularly defined usage patterns for that peripheral device node. For example, a peripheral device operational configuration policy may apply only when certain software applications are executing at the anchor node information handling system defined within the peripheral device workspace, or when one or more hardware components' (e.g., graphics processing unit (GPU), central processing unit (CPU), memory) usage metrics or connectivity metrics meet a predefined threshold.

A database memory for the peripheral device workspace management system may further store a user composite peripheral device workspace identifier that is unique to individual users of one or more defined peripheral device workspaces that are associated with identification of the user of the user's information handling system node and peripheral device workspace identification values of the peripheral device workspaces used by that user. Thus, a user composite peripheral device workspace identifier may identify a single user of an anchor node information handling system, and a peripheral device workspace identification value for each of one or more peripheral device workspaces in which the user's information handling system operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric.

Each user composite peripheral device workspace identifier may be associated with a single user, and may further include one or more user experience fingerprints with a user experience identifier (xID) defining usage patterns or the ways in which the single user uses the anchor node information handling system and one or more peripheral device nodes within defined peripheral device workspaces in which the single user operates. A user experience fingerprint having an xID may include a list of peripheral device nodes within a defined peripheral device workspace associated with a peripheral device workspace identification value and the user's composite peripheral device workspace identifier, as well as capabilities for each of those listed peripheral device nodes, and at least one peripheral device operational telemetry reading of the peripheral device workspace describing a pattern of usage for the specific user of the anchor node information handling system. The user experience fingerprint may be used to link usage patterns for the anchor node information handling system (e.g., execution of specific software applications or high usage rates for various hardware components at the anchor node) with the capabilities and settings for the operatively coupled peripheral device nodes within a given peripheral device workspace.

As described herein, when users shift from a first peripheral device workspace to a second peripheral device workspace, there is often a mismatch between the capabilities for the peripheral device nodes within these peripheral device workspaces. Code instructions for the intelligent peripheral device settings transference module at a peripheral device workspace cloud orchestrator server or servers in an embodiment may execute a clustering algorithm to group peripheral device workspaces undergoing similar usage patterns together. As described herein, execution of code instructions of intelligent peripheral device settings transference module may determine a usage pattern from peripheral device settings from a combination of peripheral device operational telemetry data readings describing the operational environment or current usage pattern for the anchor node information handling system (e.g., applications executing, hardware resource consumption rates, etc.) and the adjustable operational configurations for each of the plurality of peripheral devices operatively coupled to that anchor node, directing the ways in which such peripheral devices may operate. In other words, a determined usage pattern may connect the ways in which a user is using an anchor node information handling system with the ways in which the peripheral device nodes are operating to support such usage of the anchor node by the user.

A clustering algorithm may be executed in the intelligent peripheral device settings transference module in an embodiment, such as a density-based, distribution-based, centroid-based, or hierarchical-based clustering algorithm, for example, may analyze received peripheral device operational telemetry data readings across a plurality of peripheral device workspaces for a plurality of users who may be using these peripheral device workspaces in a variety of ways. For example, users may use some peripheral device workspaces for personal use, for design and development of computer code, for three-dimensional graphical design, for gaming, for participation in videoconferencing, or for presenting information to a group or audience among other usages. The operational telemetry data readings for an anchor node information handling system describing its usage pattern, models, types and combinations of peripheral device nodes, as well as ranges of functional capabilities and adjustable operational configurations selected from within those ranges for each of the peripheral device nodes may be fed into a clustering algorithm executing with code instructions for the intelligent peripheral device settings transference module in an embodiment. Code instructions for the clustering algorithm of the intelligent peripheral device settings transference module in an embodiment may then identify one or more usage categories into which each of the plurality of peripheral device workspaces from which such operational telemetry data readings were gathered can be grouped. Such a usage category may define one or a range of anchor node operational telemetry data readings describing usage of that anchor node, including, for example, software applications executing, battery power available, availability of connectivity to the internet or peripheral devices via any of a plurality of communication protocols, time of day, or even scheduled appointments or meetings stored in a calendar application. The usage category may also be defined by the model, type, or combination of peripheral devices operatively coupled to the anchor node, such as a combination of a mouse, two external displays, and a keyboard, or specific models of such peripheral devices, for example.

Ranges of functional capabilities and adjustable operational configurations selected from within these ranges for each of the peripheral device nodes within a given peripheral device workspace may further define the usage category in embodiments herein. For example, external display devices may include a range of display resolutions at which such devices may operate, and the adjustable operational configuration for such a display device may define a specific display resolution, within this possible range of resolutions. It is useful in embodiments to execute the code instructions for the intelligent peripheral device settings transference module to compare the range of functional capabilities between peripheral device nodes in such a way because it may provide insight into how users are configuring devices that have similar or identical available configurations. Such ranges of functional capabilities for peripheral device nodes determined by execution of the intelligent peripheral device settings transference module in embodiments herein may be drawn from peripheral device workspace anchor node status update documents received from a plurality of peripheral device workspaces over time. The ranges of functional capabilities for peripheral device nodes may be excerpted from such received documents and stored at a cloud-based golden configuration database, along with an identification of the peripheral device, make, model, type, and peripheral device workspace identification value for the peripheral device workspace in which it is included.

Each usage category determined by execution of code instructions of the clustering algorithm in the intelligent peripheral device settings transference module in embodiments herein may thus be defined by a combination of anchor node operational telemetry data readings, descriptors of a plurality of peripheral device nodes included within each peripheral device workspace having the assigned usage category (e.g., by make, model, type), and functional capabilities and adjustable operational configurations for those peripheral device nodes. A usage category in embodiments herein may include only one of each of these attributes, such as a single anchor operational telemetry reading (e.g., a specific application being executed), a single type of peripheral device (e.g., an external display device), one range of functional capabilities (e.g., a range of available display resolutions) and a single adjustable operational configuration (e.g., a specific display resolution of 4K Ultra-High Definition resolution). In such embodiments, any peripheral device workspace that includes an anchor node executing that specific identified software application operatively coupled to an external display device having the specific range of display resolutions and configured to display at the 4K UHD resolution could be assigned to this usage category.

In other embodiments herein, the usage category may include a plurality of such attributes. For example, a usage category in embodiments herein may include a plurality of anchor operational telemetry reading (e.g., a specific application being executed, a specific time of day, and a certain amount of battery power remaining), a plurality of peripheral device nodes (e.g., an external display device, a mouse, and a keyboard), and for each of these peripheral device nodes, a range of functional capabilities (e.g., a range of available display resolutions for the display device, a range of polling rates for the mouse, and a range of keystroke or button detection for the keyboard) and a single adjustable operational configuration (e.g., a specific display resolution of 4K Ultra-High Definition resolution, a specific polling rate for the mouse, and a specific keystroke or button detection value for the keyboard).

Definition of such usage categories in embodiments herein may thus result in identification for a given peripheral device workspace, of other peripheral device workspaces, either belonging to the same user or multiple users, that have similar peripheral devices configured in similar ways, to support similar workloads or usage patterns at an anchor node. Each peripheral device workspace analyzed by execution of code instructions of the intelligent peripheral device settings transference module in such a way by the clustering algorithm in an embodiment may be associated with a usage category identifier within the definition of that peripheral device workspace, and such a usage category identifier may also be associated with the user of that peripheral device workspace within that user's xID.

When the user moves from a previous peripheral device workspace to a new, current peripheral device workspace in embodiments herein, code instructions for the intelligent peripheral device settings transference module may execute at one or more peripheral device workspace cloud orchestrator servers to determine the usage category for the current peripheral device workspace. This may be done through application of the clustering algorithm executing with the code instructions of the intelligent peripheral device settings transference module to the current peripheral device workspace operational telemetry data readings, or through comparison of those readings with operational telemetry data readings shared by all peripheral device workspaces previously grouped together into a usage category by the clustering algorithm. In other words, a previously defined usage category may include a plurality of peripheral device workspaces, each having anchor nodes experiencing similar workloads and similar peripheral devices or identical types of peripheral devices, all configured according to matching adjustable operational configurations. Code instructions of the intelligent peripheral device settings transference module in embodiments herein may assign a current peripheral device workspace a previously defined usage category based on similarity between the anchor node workloads, peripheral device types included, range of functional capabilities, and adjustable operational configurations for those peripheral devices defining that usage category and the anchor node workloads, peripheral device types included, range of functional capabilities, and adjustable operational configurations for those peripheral devices for the current peripheral device workspace.

In some cases, the anchor node workloads, peripheral device types included, range of functional capabilities, and adjustable operational configurations for those peripheral devices for the current peripheral device workspace may only partially match these attributes as defining the usage category. For example, the current peripheral device workspace operational telemetry data readings may indicate only a partial match to the usage category's defining plurality of anchor node workloads, plurality of peripheral device types included, or range of functional capabilities, and adjustable operational configurations for those peripheral devices. Code instructions for the intelligent peripheral device settings transference module executing at the one or more peripheral device workspace cloud orchestrator servers in embodiments may assign a usage category comparison similarity value to each peripheral device workspace assigned to an existing usage category in such a case. This usage category comparison similarity value in embodiments may describe a percentage of the total number of anchor node workloads, peripheral device types included, range of functional capabilities, and adjustable operational configurations for those peripheral devices defining the usage category that are matched by operational telemetry data readings of the current peripheral device workspace.

Upon determination of a usage category for the current peripheral device workspace, code instructions for the intelligent peripheral device settings transference module may execute in embodiments to determine adjustable operational configurations for the current peripheral devices in the current peripheral device workspace based on the determined usage pattern. As described herein, a new or current peripheral device workspace may be assigned to a previously defined usage category, even if the anchor node workloads, peripheral device types included, range of functional capabilities, and adjustable operational configurations for those peripheral devices for the current peripheral device workspace are not an exact match with the anchor node workloads, peripheral device types included, range of functional capabilities, and adjustable operational configurations for those peripheral devices defining the usage category. In such a case, code instructions for the intelligent peripheral device settings transference module may execute to determine differences in peripheral device functional capabilities between the current peripheral device workspace and peripheral device functional capabilities defining the usage category.

Configuring a peripheral device having a first range of functional capabilities according to an adjustable operational configuration previously applied to another peripheral device having a second range of functional capabilities may result in a less enjoyable or productive experience for the user. For example, if the first range of functional capabilities is wider than the second range of functional capabilities, such as when a first external display device can display at a resolution up to 4K UHD, but a second external display device can only display at a resolution up to high-definition, configuring the first external display device using the adjustable operational configuration of the second external display device will automatically limit the display resolution below the best available resolution for the first external display device.

In contrast, some ranges of functional capabilities for peripheral devices defining the usage category may identically match those of the peripheral devices within the current peripheral device workspace. In such a case, it may be appropriate to configure the peripheral device(s) within the current peripheral device workspace having ranges of functional capabilities that match those given within the definition of the usage category according to the adjustable operational configurations for those peripheral devices, also given within the definition of the usage category. The degree to which such a reconfiguration of the current peripheral device workspace peripheral devices is appropriate may depend in embodiments on the overall similarity between the current peripheral device workspace and the defined usage category. Thus, code instructions for the intelligent peripheral device settings transference module may execute to automatically configure peripheral devices within the current peripheral device workspace according to the adjustable operational configurations for those peripheral devices given within the definition of the usage category if the usage category comparison similarity value described above meets a minimum threshold, such as 80%, 90%, 95%, etc. In cases where this usage category comparison similarity value minimum threshold is not met, code instructions for the intelligent peripheral device settings transference module may execute to recommend that the user apply such adjustable operational configurations for those peripheral devices given within the definition of the usage category. In some embodiments, execution of code instructions for the intelligent peripheral device settings transference module may weight certain environmental data factors or operational telemetry data features based on experiential impact on a user when determining if the usage category comparison similarity value described above meets a minimum threshold, such as 80%, 90%, 95%, etc.

Code instructions for the intelligent peripheral device settings transference module may also execute to determine whether the user has accepted the recommended adjustable operational configurations described directly above. If the user does not accept such a recommended adjustable operational configuration, this may indicate that the user does not plan to use the peripheral device node in the same way as other users have used similar peripheral device nodes under similar circumstances in peripheral device workspaces in the past. In such a case, the clustering algorithm of the code instructions for the intelligent peripheral device settings transference module can be refined to more accurately predict the ways in which future users will wish to configure peripheral device nodes used in similar ways and under similar circumstances at peripheral device workspaces by feeding peripheral device operational telemetry data readings describing the usage pattern for the current peripheral device workspace and a user-adjusted operational configuration (e.g., selected by the user instead of the recommended adjustable operational configuration) back into the algorithm. In such a way, the clustering algorithm for the intelligent peripheral device settings transference module may be honed over time to more accurately predict the best operational configuration for a given peripheral device node within a peripheral device workspace undergoing a specific usage pattern.

In other embodiments described herein, code instructions for the intelligent peripheral device settings transference module may execute to determine significant differences in peripheral device functional capabilities between the current peripheral device workspace and peripheral device functional capabilities defining the usage category. In such a case, it may be more appropriate to consider how other peripheral device nodes having the same functional capabilities have been configured in the past when determining the best adjustable operational configuration for the current peripheral device workspace, rather than referencing the adjustable operational configuration defining the usage category. As described herein, the ranges of functional capabilities for peripheral device nodes may be excerpted from peripheral device workspace anchor node status update documents gathered from a plurality of peripheral devices workspaces over time and stored at a cloud-based golden configuration database, along with an identification of the peripheral device, make, model, type, and peripheral device workspace identification value for the peripheral device workspace in which it is included. Such a golden configuration database may further include a default configuration for each such peripheral device node, as set according to a manufacturer's instructions for example, a laboratory-testing derived best configuration as provided by an information technology decision maker (ITDM), or a crowd-sourced best rated configuration determined based on peripheral device operational telemetry data readings across a plurality of peripheral device workspaces received over time.

Code instructions for the intelligent peripheral device settings transference module in embodiments may execute to instruct the anchor node to recommend that the user apply an adjustable operational configuration associated with comparable peripheral device nodes identified within the golden configuration database, as described directly above. If the user does not accept this recommendation, the crowd-sourced best rated configuration may be adjusted based on this received user feedback. In such a way, code instructions for the intelligent peripheral device settings transference module may accurately predict the best operational configuration for a given peripheral device node within a peripheral device workspace undergoing a specific usage pattern, and may either automatically institute such a configuration, or recommend that the user do so.

FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be one of a plurality of device nodes as part of a peripheral device workspace described in embodiments herein. Additionally, an information handling system 100 or an information handling system with some similar components may serve as a peripheral device workspace cloud orchestrator server 158 that is operatively coupled to a peripheral device workspace cloud orchestrator console 160 in the peripheral device workspace cloud orchestrator 156 described herein. In an embodiment, the cloud orchestrator console 160 may also be an information handling system 100 itself that is used by an internet technology decision maker (ITDM) to create peripheral device operational configuration policies with one or more peripheral device workspace cloud orchestrator servers 158 to be propagated down to node devices within a peripheral device workspace such as the information handling system 100, a docking station 151, video display device 144, keyboard 146, stylus 148, trackpad 150, mouse 152, and the like. In this embodiment, the information handling system 100, may receive the peripheral device operational configuration policies generated by the ITDM at the peripheral device workspace cloud orchestrator console 160, or generated by the peripheral device workspace cloud manageability orchestrator module 166 based on default peripheral device configuration settings via execution of code instructions of the cloud manageability orchestrator module 166 and the ecosystem manageability service module 168 at the peripheral device workspace cloud orchestrator server 158 as described in embodiments herein.

Thus, in a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other hardware processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a docking station 151, a keyboard 146, a mouse 152, video display device 144, stylus 148, or trackpad 150 among other peripheral devices any combination of which may form one or more various peripheral device workspaces according to embodiments herein.

The information handling system 100 further includes a video/graphics display device 144. The video/graphics display device 144 in an embodiment may function as a liquid crystal display (LCD), an organic light emitting diode (OLED), a flat panel display, or a solid-state display. It is appreciated that the video/graphics display device 144 may be wired or wireless and may be an external video/graphics display device 144 that allows a user to increase the desktop area by extending the desktop in an embodiment. Additionally, as described herein, the information handling system 100 may include or be operatively coupled to one or more other I/O devices 142 including the wired or wireless mouse 152 described herein that allows the user to interface with the information handling system 100 via the video/graphics display device 144, a cursor control device (e.g., a trackpad 150, or gesture or touch screen input), a stylus 148, and/or a keyboard 146, among others. Information handling system 100 may also be operatively coupled to a peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may each be a node device associated with the information handling system 100 and may be part of a peripheral device workspace defined and identified with a peripheral device workspace identification value via execution of the ecosystem manageability service module 168 and cloud manageability orchestrator module 166, as described in embodiments herein. Various drivers and hardware control device electronics may be operatively coupled to operate the I/O devices 142 according to the embodiments described herein. The present specification contemplates that the I/O devices 142 may be wired or wireless.

A network interface device of the information handling system 100 may be a wired network interface device or a wireless interface adapter 128 that can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources that allow for the creation and maintenance of peripheral device workspaces and orchestration of different node devices within one or more peripheral device workspaces. In embodiments described herein, the wireless interface device 128 with its radio 130, RF front end 132 and antenna 134 is used to communicate with the wireless peripheral devices via, for example, a Bluetooth® or Bluetooth® Low Energy (BLE) protocols. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device or wireless interface adapter 128. It is appreciated that any computing device including the cloud orchestrator server 158, the cloud orchestrator console 160, and the information handling system 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a code instructions for a peripheral device workspace cloud orchestrator 156 with a plurality of software modules executing on any number of servers, computing devices, and other cloud computing resources such as the peripheral device workspace cloud orchestrator server 158. The peripheral device cloud orchestrator 156 may, therefore, execute on any hardware that may be distributed over multiple physical locations but act in concert with each other and specifically the peripheral device workspace cloud orchestrator server 158 to facilitate maintenance and implementation of peripheral device operational configuration policies for a plurality of peripheral device workspaces, wherein the one or more node devices (e.g., including the information handling system 100 as an anchor node device, and one or more peripheral device nodes such as I/O devices 142) form part of each peripheral device workspace, create or adjust peripheral device operational configuration policies based on the registered node devices detected within the one or more created peripheral device workspaces, and apply the peripheral device operational configuration policies to the created peripheral device workspace(s). It is appreciated that the node devices described herein may include each of the peripheral devices operatively coupled to the information handling system 100 acting as a primary or anchor node device at one or more locations managed for an enterprise and workspaces created may be described as a peripheral device workspace.

The peripheral device workspace cloud orchestrator server 158 may be any computing device that may include similar elements as the information handling system 100 such as a memory device, a cloud orchestrator hardware processing device 170, a PMU, and other elements that allow the peripheral device workspace cloud orchestrator server 158 to execute code instructions of the cloud manageability orchestrator module 166, ecosystem manageability service module 168, intelligent peripheral device settings transference module 169, and other software as described herein.

In an embodiment, the peripheral device workspace cloud orchestrator server 158 may be operatively coupled to a peripheral device workspace cloud orchestrator console 160. The peripheral device workspace cloud orchestrator console 160 may be used by the ITDM in some embodiments to create and propagate peripheral device operational configuration policies, or to manage dynamic peripheral device workspace sessions (e.g., associate a user's identification with a peripheral device workspace with a user composite peripheral device workspace identifier). It is appreciated that the peripheral device workspace cloud orchestrator console 160 may include a cloud orchestrator input device 162 and a cloud orchestrator video display device 164 that allows the ITDM to complete these processes and engage with the peripheral device workspace cloud orchestrator server 158 in an embodiment.

As described herein, the peripheral device workspace cloud orchestrator server 158 includes a computer-readable program code of a peripheral device workspace cloud manageability orchestrator module 166 that, when executed by the cloud orchestrator hardware processing device 170 of the peripheral device workspace cloud orchestrator server 158, manages creation and adjustment of peripheral device operational configuration policies for one or more node devices. In the context of embodiments of the present specification and in the appended claims, a peripheral device workspace may be an ecosystem of node devices (e.g., including peripheral devices coupled to the information handling system 100, a docking station 151, etc.) connected to a primary or anchor node device such as the information handling system 100. In an embodiment, a peripheral device workspace may also be defined with a peripheral device workspace identification value and be part of a user composite peripheral device workspace identifier for a user and associated with each of the information handling system 100 and peripheral devices (e.g., input/output devices 142) such that a user may have multiple peripheral device workspaces having peripheral device workspace identification values that are associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location of the peripheral device workspace (e.g., defined by location data such as GPS data, network data, or other data to link to a physical location) and having a having a peripheral device workspace identification value.

In an embodiment, the execution of computer-readable program code of the peripheral device workspace cloud manageability orchestrator module 166 causes the peripheral device workspace cloud orchestrator server 158 to receive, create, or adjust peripheral device operational configuration policies based on the registered node devices detected within the one or more created peripheral device workspaces having peripheral device workspace identification values. In some embodiments, the peripheral device operational configuration policies may be received from the peripheral device workspace cloud orchestrator console 160 as initiated by the ITDM or automatically generated from execution of one or more software modules of the peripheral device workspace cloud manageability orchestrator module 166. The ITDM may be any information technology decision maker that may decide the peripheral device operational configuration policies to be associated with peripheral device workspaces managed by an enterprise and formed at the peripheral device workspace cloud orchestrator server 158 and having peripheral device workspace identification values. For example, the ITDM may decide which settings for each of the node devices, including the primary or anchor node device, is an optimal and desired setting to be used. In such an example embodiment, the ITDM may create these peripheral device operational configuration policies and desired settings at the peripheral device workspace cloud orchestrator console 160 for capabilities of particular peripheral devices. In other example embodiments, these settings may be set by the peripheral device workspace cloud manageability orchestrator module 166 to a default configuration or other configuration determined based on identified capabilities of a given peripheral device or detected operational telemetry data and execution of one or more software modules regulation configuration at the peripheral device workspaces, as described herein. In various embodiments herein, the peripheral device workspace cloud orchestrator console 160 may propagate these peripheral device operational configuration policies to the peripheral device workspace cloud orchestrator server 158 executing the peripheral device workspace cloud manageability orchestrator module 166. Upon receipt of these peripheral device operational configuration policies created at the peripheral device workspace cloud orchestrator server 158 by the ITDM or by the peripheral device workspace cloud manageability orchestrator module 166, the execution of the peripheral device workspace cloud manageability orchestrator module 166 may propagate these peripheral device operational configuration policies to each of the device nodes within the created peripheral device workspace.

In an embodiment, the peripheral device workspace cloud orchestrator server 158 may also execute computer readable program code of an ecosystem manageability service module 168. Execution of the ecosystem manageability service module 168 applies the peripheral device operational configuration policies to the created peripheral device workspace. In an embodiment, the peripheral device workspace cloud manageability orchestrator module 166 creates or adjusts peripheral device operational configuration policies for each of the one or more node devices within the peripheral device workspace. As described herein, the ecosystem manageability service module 168 may identify those peripheral device nodes 142 that form part of the peripheral device workspace having a peripheral device workspace identifier value and may propagate those peripheral device operational configuration policies that apply to those peripheral devices. For example, where a plurality of peripheral device workspaces with a plurality of peripheral device workspace identifier values each include a specific wireless mouse 152 for which a peripheral device operational configuration policy has been created or updated, the execution of the computer-readable program code of the ecosystem manageability service module 168 causes the peripheral device workspace cloud orchestrator server 158 to send those peripheral device operational configuration policies to the appropriate peripheral device workspace (e.g., to each of the primary or anchor node devices 100) so that those peripheral device operational configuration policies may be passed to the wireless mice 152 in each peripheral device workspace having a peripheral device workspace identifier value where such as specific mouse model or type is located.

A node device database as part of a peripheral device workspace management system database 167 operatively coupled to the peripheral device workspace cloud orchestrator server 158 may provide the peripheral device workspace cloud orchestrator server 158 with details regarding the node devices detected and forming the peripheral device workspaces and associated particular peripheral device workspace identification values described herein. For example, the node device database as part of a peripheral device workspace management system database 167 may include data regarding the possible settings for any given node device, compatibility of these node devices with other node devices within any given peripheral device workspace, and capabilities of the node devices among other characteristics and features of the node devices.

An information handling system 100 that is operatively connected to one or more peripheral devices 142 in an embodiment may operate as an anchor node for the peripheral device workspace in that it gathers capabilities and peripheral device operational telemetry data readings about all of the peripheral devices 142, within a given peripheral device workspace, as described directly below, communicates that peripheral device operational telemetry data readings to the cloud manageability orchestrator module 166, receives peripheral device operational configuration policies describing how to configure the peripheral devices 142, and the anchor node information handling system 100 itself, and implements peripheral device operational configuration policies. As a user moves from one peripheral device workspace to another, execution of code instructions for the cloud-based intelligent peripheral device settings transference module 169 may determine the best or most appropriate peripheral device operational configuration policies for a current peripheral device workspace, based on previously defined peripheral device operational configuration policies set by an ITDM or by various users for various other peripheral devices 142 previously established within previous peripheral device workspaces associated with usage patterns matching that of the current peripheral device workspace, and a comparison of capabilities for each peripheral device in the current peripheral device workspace and other peripheral devices 142 within previous peripheral device workspaces. Such a determination from execution of code instructions of the cloud-based intelligent peripheral device settings transference module 169 may further depend upon the peripheral device operational telemetry data readings, which may include, for example, time of day, applications being executed, wireless or wired connection capabilities, or security credentials for the user.

Execution of code instructions for an ecosystem manageability sub-agent 172 on a user information handling system 100 monitors for sets of peripheral device operational telemetry data readings of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible peripheral device operational telemetry data readings for the information handling system node 100 and peripheral device nodes 142 in a peripheral device workspace. These peripheral device operational telemetry data readings associated with a peripheral device workspace identification value may be gathered routinely in telemetry measurements, or upon each startup of an anchor information handling system 100, for example. The ecosystem manageability sub-agent 172 executing at the information handling system 100 in a peripheral device workspace 101 may create a manifest of peripheral device nodes 142 and other nodes for a peripheral device workspace identification value to represent the current peripheral device workspace, including an identification of a location, identification of the user, and an identification (e.g., by product serial number or other peripheral device identification) of each of the peripheral device nodes 142 connected to or operably coupled to the anchor information handling system 100 at a peripheral device workspace. Identification of the each of the peripheral device nodes 142 may include or be associated with an orchestrated device descriptor (ODD) in various embodiments herein.

The hardware processor 102 of the user anchor information handling system 100 may execute code instructions of the ecosystem manageability sub-agent 172 to also collect one or more peripheral device operational telemetry data readings (e.g., time, applications executing, hardware component usage metrics, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational telemetry data readings for the peripheral device workspace and an identification of the anchor node information handling system 100 user into a peripheral device workspace anchor node status update document written in a machine-readable language or machine markup language such as JavaScript Object Notation (JSON), for example, and to be associated with a peripheral device workspace identification value. The peripheral device workspace anchor node status update document may be transmitted for storage with the peripheral device workspace identification value at a peripheral device workspace management system database 167 operating in the peripheral device workspace cloud orchestrator 156. Each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator 156.

The peripheral device workspace management system database 167 may further store a user composite peripheral device workspace identifier that is unique to individual users of one or more defined peripheral device workspaces that are associated with identification of the user of the user's information handling system 100 and peripheral device workspace identification values of the peripheral device workspaces used by that user. Thus, a user composite peripheral device workspace identifier may identify a single user of an anchor node information handling system 100, and a peripheral device workspace identification value for each of one or more peripheral device workspaces in which the user's information handling system 100 operates as an anchor node at various times. The user composite peripheral device workspace identifier may thus be user-specific and user-centric. The peripheral device workspace identification value, in comparison, may define a location and list of peripheral device nodes 142, and may thus be peripheral device workspace-centric. Each user composite peripheral device workspace identifier may be associated with a single user, and may further include one or more user experience fingerprints with a user experience identifier (xID) defining usage patterns or the ways in which the single user uses the anchor node information handling system 100 and one or more peripheral devices 142 within defined peripheral device workspaces in which the single user operates during usage sessions at peripheral device workspaces.

A user experience fingerprint may include a list of peripheral device nodes 142 within a defined peripheral device workspace associated with a peripheral device workspace identification value and the user's composite peripheral device workspace identifier, as well as capabilities for each of those listed peripheral devices 142, and at least one peripheral device operational and environmental context telemetry reading of the peripheral device workspace describing a pattern of usage for the specific user of the anchor node information handling system 100. The at least one peripheral device environmental context data feature and operational telemetry data reading of the peripheral device workspace describing a pattern of usage records the setting and configurations established by a user at a peripheral device workspace and records the activity being conducted, such as gaming, workplace proficiency software execution for various work activities, teleconference meetings, or the like. Execution of code instructions for the cloud-based intelligent peripheral device settings transference module 169 may access and utilize the user experience fingerprint to link usage patterns for the anchor node information handling system 100 (e.g., execution of specific software applications or high usage rates for various hardware components at the anchor node) with the capabilities and settings for the operatively coupled peripheral devices 142 within the peripheral device workspace.

Upon determination of a usage category for the current peripheral device workspace, code instructions for the intelligent peripheral device settings transference module 169 may execute at the peripheral device workspace cloud orchestrator server 158 in embodiments to determine adjustable operational configurations for the current peripheral device nodes in the current peripheral device workspace based on the determined usage pattern. As described herein, a new or current peripheral device workspace may be assigned to a previously defined usage category, even if the anchor node workloads, peripheral device types included, range of functional capabilities, and adjustable operational configurations for those peripheral devices for the current peripheral device workspace are not an exact match with the anchor node workloads, peripheral device types included, range of functional capabilities, and adjustable operational configurations for those peripheral devices defining the usage category. In such a case, code instructions for the intelligent peripheral device settings transference module 169 may execute to determine differences, if any, in peripheral device functional capabilities between the current peripheral device workspace and peripheral device functional capabilities defining the usage category. Based on the same, the execution of the code instructions for the intelligent peripheral device settings transference module 169 may automatically transfer adjustable configuration settings to the new peripheral device workspace, recommend adjustable configuration settings at the new peripheral device workspace to a user or ITDM, or apply default or crowd-sourced adjustable configuration settings to nodes in the new peripheral device workspace for a usage context category according to embodiments herein.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
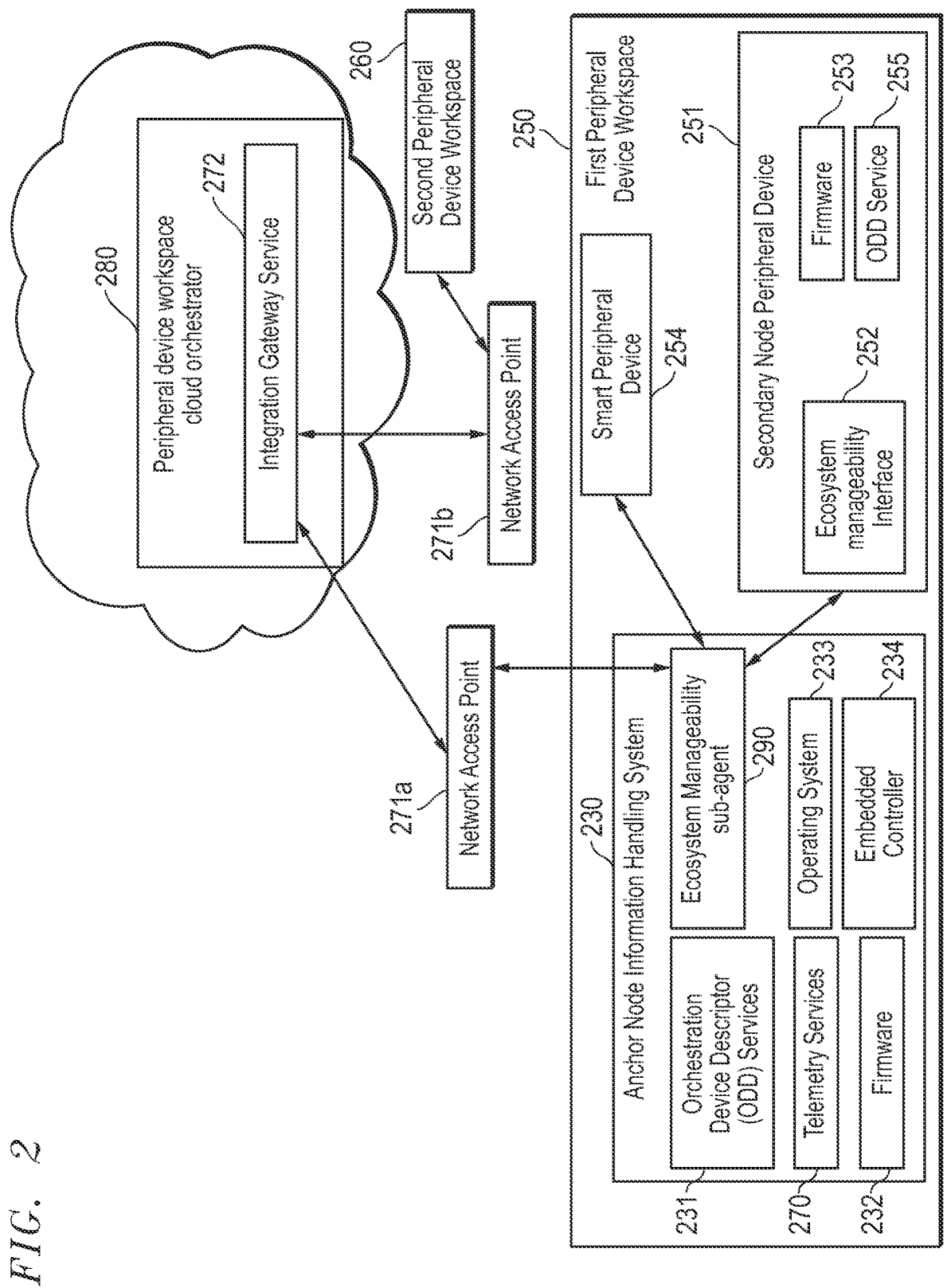
FIG. 2 is a block diagram illustrating a cloud-based peripheral device workspace cloud orchestrator for defining a first peripheral device workspace including a user information handling system node and peripheral device nodes according to an embodiment of the present disclosure.

FIG. 2 is a block diagram illustrating a cloud-based peripheral device workspace cloud orchestrator executing on one or more peripheral device workspace cloud orchestrator servers for defining a first of a plurality of peripheral device workspaces under management of an enterprise in which a user information handling system operatively couples with a first plurality of peripheral devices according to an embodiment of the present disclosure. As described previously, a user may oftentimes use an information handling system 230 in a peripheral device workspace 250. In this context, a peripheral device workspace 250 or 260 can be viewed as an environment with a location identifier that includes the user information handling system node 230 (e.g., a laptop) operating as a primary or anchor node for the peripheral device workspace 250 and peripheral device nodes 251 and 254 operating as secondary nodes of the peripheral device workspace 250 that are operatively coupled to the user information handling system 230 at the location. A set of environmental context data may include, for example, location, time of day, applications being executed, wireless or wired connection capabilities, or security credentials for the user.

Peripheral device nodes 251 and 254 may commonly include internal or external devices such as displays, a keyboard, a mouse, a webcam, a printer, a speaker, a fingerprint scanner, etc. According to various embodiments herein, a peripheral device workspace 250 or 260 may include a wired or wireless dock by which the user information handling system node 230 connects to some or all the peripheral device nodes including smart peripheral device nodes such as 254 having some compute or input/output capabilities. Peripheral device node 254 in an example embodiment may considered a "smart" peripheral device node because it may operate an agent or firmware, and include a network interface device or wireless receiver that makes the smart peripheral device node 254 capable of direct communication with the cloud-based peripheral device workspace cloud orchestrator 280 via the integration gateway services 272 and the network access point 271 for some subset of secondary nodes. Similarly, a primary or anchor node information handling system node 230 is also capable of direct communication with the cloud-based peripheral device workspace cloud orchestrator 280 via the integration gateway services 272 and the network access point 271 for some or all secondary nodes in the peripheral device workspace 250 or 260.

A peripheral device workspace 250 or 260 may oftentimes be used for hybrid work scenarios. For example, a business may have an office space that includes hoteling cubes that can be assigned to, reserved by, or otherwise utilized by the business's employees as peripheral device workspaces 250 or 260. In such cases, the business may allow its employees to connect their laptops (e.g., 230) to a dock (e.g., 254) in a particular hoteling cube where various peripherals (e.g., 251) may be available for use. A business may also have a collaborative peripheral device workspace 250 or 260 that may be a conference room or meeting room where plural users with plural primary node information handling systems 230 utilize some or all peripheral device nodes in that peripheral device workspace at the same time. Users may also employ peripheral device workspaces 250 or 260 when working from home or other locations.

When a user employs multiple peripheral device workspaces 250 or 260 (e.g., by connecting a laptop to different combinations of peripheral devices during a workday), it can be tedious for the user to configure the peripheral device workspaces 250 or 260 to his or her preferences. For example, while using one peripheral device workspace 250, the user may set configurations for the peripheral device nodes 251 and 254 of the peripheral device workspace 250 to match the user's preferences or they may be configured to meet an operating policy set by an ITDM for a given peripheral device workspace. If the user switches to a different peripheral device workspace 260, those configurations may not be consistent with the peripheral device nodes (not shown) of the different peripheral device workspace 260 or may result in unintended changes. The user may therefore have to manually reconfigure the peripheral device nodes (not shown) within the peripheral device workspace 260.

As one particular example, a user may have a home peripheral device workspace 250 that includes a 4K monitor peripheral device 251 with 3840×2160 resolution at 60 Hz that is in landscape orientation and that also includes a 32-inch Full High Definition (FHD) monitor with 1920×1080 resolution that is in portrait orientation. This user may have set adjustable operational configurations for this home peripheral device workspace 250 to personalize these display devices. The user may also have access to multiple office peripheral device workspaces such as 260 (e.g., in a hoteling scenario), and these peripheral device workspaces such as 260 may have different sets of peripheral devices such as a first office peripheral device workspace with two display devices and a second office peripheral device workspace with a single display device or a conference room. If the user's adjustable operational configurations for the home peripheral device workspace 250 are applied to the office peripheral device workspaces such as 260, the display device(s) will likely not be configured in accordance with the user's preferences. The user will then need to manually reconfigure the office peripheral device workspace 260 to achieve her preferences. When the user returns to her home peripheral device workspace 250, she may again be required to manually reconfigure the home peripheral device workspace 250. As can be seen, when using multiple peripheral device workspaces 250 and 260, personalized adjustable operational configurations for peripheral devices such as 251 are likely to be lost or misapplied due to the mismatching set of peripheral devices that make up the peripheral device workspaces 250 and 260. These issues arise in cases where the user switches between entirely different peripheral device workspaces 250 and 260 (e.g., when leaving home where a home peripheral device workspace is used to travel to work where an office peripheral device workspace is used) as well as in cases where the user creates a different peripheral device workspace 250 or 260 through the connection and/or disconnection of a peripheral device node such as 251 or 254 (e.g., when connecting an external webcam to a dock or laptop that is part of an existing peripheral device workspace).

Execution of code instructions for an ecosystem manageability sub-agent 290 on a user information handling system 230 monitor telemetry data readings taken by a telemetry service 270 for peripheral device operational telemetry data readings of a peripheral device workspace, such as time, location, applications currently executing or planned, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible telemetry data readings for the information handling system 230. These peripheral device operational telemetry data readings may be gathered routinely, or upon each startup of an information handling system 230, for example.

In addition, the peripheral device workspace cloud orchestrator 280 may gather peripheral device operational telemetry data readings regarding the range of capabilities for each peripheral device (e.g., 251 and 254). Each peripheral device node, such as 251 may include a range of capabilities, and the user may choose to configure the peripheral device 251 to operate according to a selected setting or configuration within this range of capabilities. For example, in an embodiment in which the peripheral device node 251 is an external display device, the peripheral device 251 may be capable of operating within a range of functional capabilities defining the display resolution, such as between a resolution of 640×480 pixels, which may be the lowest resolution supported by the operating system 233, and 3840×2160 pixels, which is the standard resolution for 4K Ultra-High Definition (4K UHD) monitors. Thus, the functional capabilities for the peripheral device node 251 in such an example may be the entire range between 640×480 pixels and 3840×2160 pixels. The user may select an adjustable operational configuration for the peripheral device node 251 by choosing one available resolution within this range of 620×480 pixels and 3840×2160 pixels. This may be done by the user, for example, through a "preferences," "properties," or "settings" user interface within the operating system 233. Because the user may choose one of several available configurations within the range of functional capabilities, the chosen configuration may be referred to herein as an adjustable operational configuration that may be selected by the user. In some cases, the peripheral device node 251 may be preset with a default configuration. These default configurations may also be considered adjustable operational configurations herein, in that the user has the opportunity to adjust such a default configuration through the "preferences," "properties," or "settings" user interface within the operating system 233. In such a way, the peripheral device 251 may be configured according to a user-selectable, adjustable operational configuration that lies within a range of functional capabilities for the peripheral device node. Other capabilities may include connectivity capabilities for a peripheral device node 251, such as types of wired connectors or wireless protocols available configuration may include selection of connectivity type as well as speeds or bandwidths available.

The peripheral device operational telemetry data readings defining the range of functional capabilities for the peripheral device node 251 may be stored at the peripheral device node 251, within the firmware 253. In another embodiment, the range of functional capabilities for the peripheral device node 251 may be stored at an orchestration device descriptor (ODD) service 255. In an embodiment, the ODD service 255 for the peripheral device node 251 may also store static or non-adjustable features for the peripheral device node 251, such as locations for various ports, physical dimensions of the peripheral device node 251, or physical locations for internal components such as an embedded camera. Model number, device number, serial number media access control (MAC) address, or other identifying information for the peripheral device node 251 may also be stored within the ODD service 255 with an ODD for a peripheral device node 251, or within firmware 253. The ODD for peripheral devices includes a description of all non-configurable aspects of the peripheral device, as well as the configurable capabilities of such a device, a unique peripheral device identifier such as a serial number, and a peripheral device type classification (e.g., mouse, display, keyboard, webcam, etc.).

The ecosystem manageability sub-agent 290 of the anchor node information handling system 230 in an embodiment may retrieve the functional capabilities for the peripheral device node 251 from the firmware 253 or ODD services 255 via communication with the ecosystem manageability interface 252, which may act as an application programming interface (API), for example, between the firmware 253 or ODD services 255 and the ecosystem manageability sub-agent 290. The ecosystem manageability sub-agent 290 in an embodiment may gather this information from the seamless workspace ecosystem maintenance interface 252, for example, upon each detection of operative coupling of the peripheral device nodes 251, respectively, with the anchor node information handling system 230, or upon an initial pairing. In an embodiment, the ecosystem manageability sub-agent 290 in an embodiment may transmit the gathered functional capabilities for the peripheral device node 251 to the peripheral device workspace cloud orchestrator 280, via the network access point 271*a* and the integration gateway service 272.

The anchor node information handling system 230 in an embodiment may also include a hardware processor or embedded controller 234 executing code instructions of the ecosystem manageability sub-agent 290. The anchor node 230 in an example embodiment may be operatively coupled to a secondary node peripheral device node 251, which may further include a microcontroller executing code instructions of an ecosystem manageability interface 252, firmware 253, and ODD services 255. The ecosystem manageability 252 in an embodiment may facilitate communication between the ecosystem manageability sub-agent 290 and the firmware 253 or ODD services 255 for the secondary node peripheral device node 251. Although not shown in FIG. 2, the smart peripheral device node 254 may further include internal components facilitating communication of peripheral device operational telemetry data readings for the peripheral device node 254 to the ecosystem manageability sub-agent 290.

The ecosystem manageability sub-agent 290 in an embodiment may gather, via ecosystem manageability interface 252, various peripheral device operational telemetry data readings describing adjustable configurations for the secondary node peripheral device node 251 within the peripheral device workspace 250. For example, in an embodiment in which the peripheral device node 251 is an external display device, the ecosystem manageability sub-agent 290 may gather telemetry information including a current adjustable operational configuration at the peripheral device node 251 for display resolution, display refresh rate, brightness, contrast, color gamut, horizontal view angle, vertical view angle, and response time. As another example, in an embodiment in which the peripheral device node 251 is an external webcam, the ecosystem manageability sub-agent 290 may gather telemetry information including a current adjustable operational configuration at the peripheral device node 251 for audio/visual connection type (e.g., HDMI, digital audio, etc.), video capture resolution, image depth, video capture refresh rate, or captured frames per second. In still another example, in an embodiment in which the peripheral device node 251 is an external microphone, the ecosystem manageability sub-agent 290 may gather telemetry information including a current adjustable operational configuration at the peripheral device node 251 for audio output type, audio output frequency, or audio filters (e.g., noise reduction). In yet another example embodiment, in which the peripheral device node 251 is an external speaker, the ecosystem manageability sub-agent 290 may gather telemetry information including a current adjustable operational configuration at the peripheral device node 251 for audio input type, and audio input frequency. In yet another example embodiment, in which the peripheral device node 251 is mouse, touchpad, touchscreen, or keyboard, the ecosystem manageability sub-agent 290 may gather telemetry information including a current adjustable operational configuration at the peripheral device node 251 for polling rate, keystroke or button detection, sensitivity levels, power source levels and other settings. Other types of peripheral device nodes 251 are also contemplated and may include relevant current adjustable operational configuration telemetry data as environmental context data for any peripheral device types as described herein. A similar method of gathering telemetry for a smart peripheral device node 254 may also be performed via the ecosystem manageability sub-agent 290 in an embodiment.

The ecosystem manageability sub-agent 290 executing at the information handling system 230 may create a manifest listing each of the peripheral device nodes 251 and 254 within the peripheral device workspace 250, as well as the anchor node 230. The manifest of peripheral device nodes 251 and 254 and other nodes 230 as well as location of a peripheral device workspace 250 may be combined with the peripheral device operational telemetry data readings for the peripheral device workspace 250 for capabilities and configuration settings and an identification of the anchor node information handling system 230 user into a peripheral device workspace anchor node status update document written in a machine-readable language or machine markup language such as JavaScript Object Notation (JSON), for example, for the peripheral device workspace. The peripheral device workspace anchor node status update document is transmitted for storage with the peripheral device workspace identification value at a peripheral device workspace management system database operating in the peripheral device workspace cloud orchestrator 280 executing at the peripheral device workspace cloud orchestrator servers. Each time a peripheral device configuration setting is changed by the user, a new peripheral device node is added to the peripheral device workspace 250, or changes to environmental context data for the peripheral device workspace 250 are detected, a new peripheral device workspace 250 anchor node status update document including this updated configuration may be transmitted to the peripheral device workspace cloud orchestrator 280.

The anchor node information handling system 230 in an embodiment may be operatively connected to the internet via a network access point (AP) 271a, which may further connect to one or more cloud-based applications, servers, or systems. Such cloud-based applications in an embodiment may include code instructions for a peripheral device workspace cloud orchestrator 280 and related software modules executing on a peripheral device workspace cloud orchestrator server which communicates with the remote anchor node information handling system 230 in various peripheral device workspaces 250 and 260, respectively, via an integration gateway service 272. The integration gateway service 272 in an embodiment may operate as an Application Programming Interface (API) or a Query Language (QL) supervisor to control communications to and from the peripheral device workspace cloud orchestrator 280, for example. More specifically, the integration gateway service 272 may, via an API, control the query language in which queries are made to the peripheral device workspace cloud orchestrator 280. As another example, the integration gateway service 272 may use a query language supervisor, such as GraphQL® to control such queries and the format in which results are provided by execution of the code instructions for the peripheral device workspace cloud orchestrator 280. The anchor node 230 may communicate gathered peripheral device telemetry, as well as telemetry specific to the anchor node 230 itself, to the peripheral device workspace cloud orchestrator 280 executing on the peripheral device workspace cloud orchestrator servers via this integration gateway service 271a.

Various peripheral device workspaces (e.g., 250 and 260) such as the hybrid work office peripheral device workspaces, collaborative peripheral device workspaces, and other peripheral device workspaces described herein may be defined by location indicator detected for an anchor node information handling system 230 operating at the peripheral device workspace 250, and a manifest of nodes of peripheral device nodes 251 and smart device nodes 254 that may operate in the peripheral device workspace 250. Each such defined peripheral device workspace 250 or 260 may also be assigned a peripheral device workspace identification value which may be stored and associated with stored manifests of nodes 230, 251, and 254 operating in the peripheral device workspace 250. Additional environmental context data for the peripheral device workspace 250 may be stored within one or more peripheral device workspace anchor node status update documents as well as included in the definition of the peripheral device workspace and associated with its peripheral device workspace identification value defined at the peripheral device workspace cloud orchestrator 280 server database, including peripheral device capabilities, peripheral device connectivity details, current peripheral device configurations or settings, peripheral device setting or configuration options, current status of the device nodes 230, 251, and 254, within the peripheral device workspace 250, and other features of device nodes 230, 251, and 254 within the peripheral device workspace 250. For example, the definition of the peripheral device workspace 250 associated with a specific peripheral device workspace identification value may include a set of environmental context data and stored within one or more peripheral device workspace anchor node status update documents, such as time, applications currently executing or planned, connection type, hardware component capabilities or usage metrics, or environmental sensor readings (e.g., humidity, temperature), among other possible environmental context telemetry data readings for an anchor node information handling system 230 operating within the defined peripheral device workspace 250.

A peripheral device workspace 250 may be defined by a location, a list of peripheral device nodes 251 and 254 operatively coupled to an anchor node information handling system 230 for a user, type of peripheral device workspace (e.g., personal, hoteling office/shared, or collaborative), and additionally in some cases, by one or more of the environmental context data for the peripheral device workspace 250 described herein. Each of these defining factors may be associated in a database memory at the peripheral device workspace cloud orchestrator servers with the peripheral device workspace identification value, which may also be associated with one or more peripheral device operational configuration policies describing how the device nodes 230, 251 and 254 within the defined peripheral device workspace 250 are to operate. Thus, a particular peripheral device operational configuration policy for one or more peripheral device nodes 251 or 254 within a given peripheral device workspace 250 having a peripheral device workspace identification value may apply only when certain environmental context telemetries, such as telemetries describing usage patterns for those peripheral device nodes 251 or 254 are detected. In such a way, the peripheral device operational configuration policy for a peripheral device such as 251 or 254 within a peripheral device workspace 250 may be defined or associated with particularly defined usage patterns for that peripheral device. For example, a peripheral device operational configuration policy may apply only when certain software applications are executing at the anchor node information handling system 230 defined within the peripheral device workspace 250, or when one or more hardware components' (e.g., graphics processing unit (GPU), central processing unit (CPU), memory) usage metrics or connectivity metrics meet a predefined threshold.

A database memory for the peripheral device workspace cloud orchestrator 280 may further store a user composite peripheral device workspace identifier that is unique to individual users of one or more defined peripheral device workspaces 250 or 260 that are associated with identification of the user of the user's information handling system 230 and peripheral device workspace identification values of the peripheral device workspaces 250 or 260 used by that user. Thus, a user composite peripheral device workspace identifier may identify a single user of an anchor node information handling system 230, and a peripheral device workspace identification value for each of one or more peripheral device workspaces 250 or 260 in which the user's information handling system 230 operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric. Each user composite peripheral device workspace identifier may be associated with a single user such as the user of information handling system anchor node 230, and may further include one or more user experience fingerprints with a user experience identifier (xID) defining usage patterns or the ways in which the single user uses the anchor node information handling system 230 and one or more peripheral device nodes such as 251 and 254 within defined peripheral device workspaces 250, 260, or 270 in which the single user operates during usage sessions.

A user experience fingerprint, having an user experience identification (xID) may include a list of peripheral device nodes, such as 251 and 254, within a defined peripheral device workspace, such as 250, associated with a peripheral device workspace identification value and the user's composite peripheral device workspace identifier, as well as capabilities for each of those listed peripheral device nodes 251 and 254, and at least one peripheral device operational telemetry reading of the peripheral device workspace 250 describing a pattern of usage for the specific user of the anchor node information handling system 230 during sessions of usage. The user experience fingerprint may be used to link usage patterns for the anchor node information handling system 230 (e.g., execution of specific software applications or high usage rates for various hardware components at the anchor node 230) with the capabilities and settings for the operatively coupled peripheral device nodes 251 and 254 within the peripheral device workspace 250.

Figure 3:
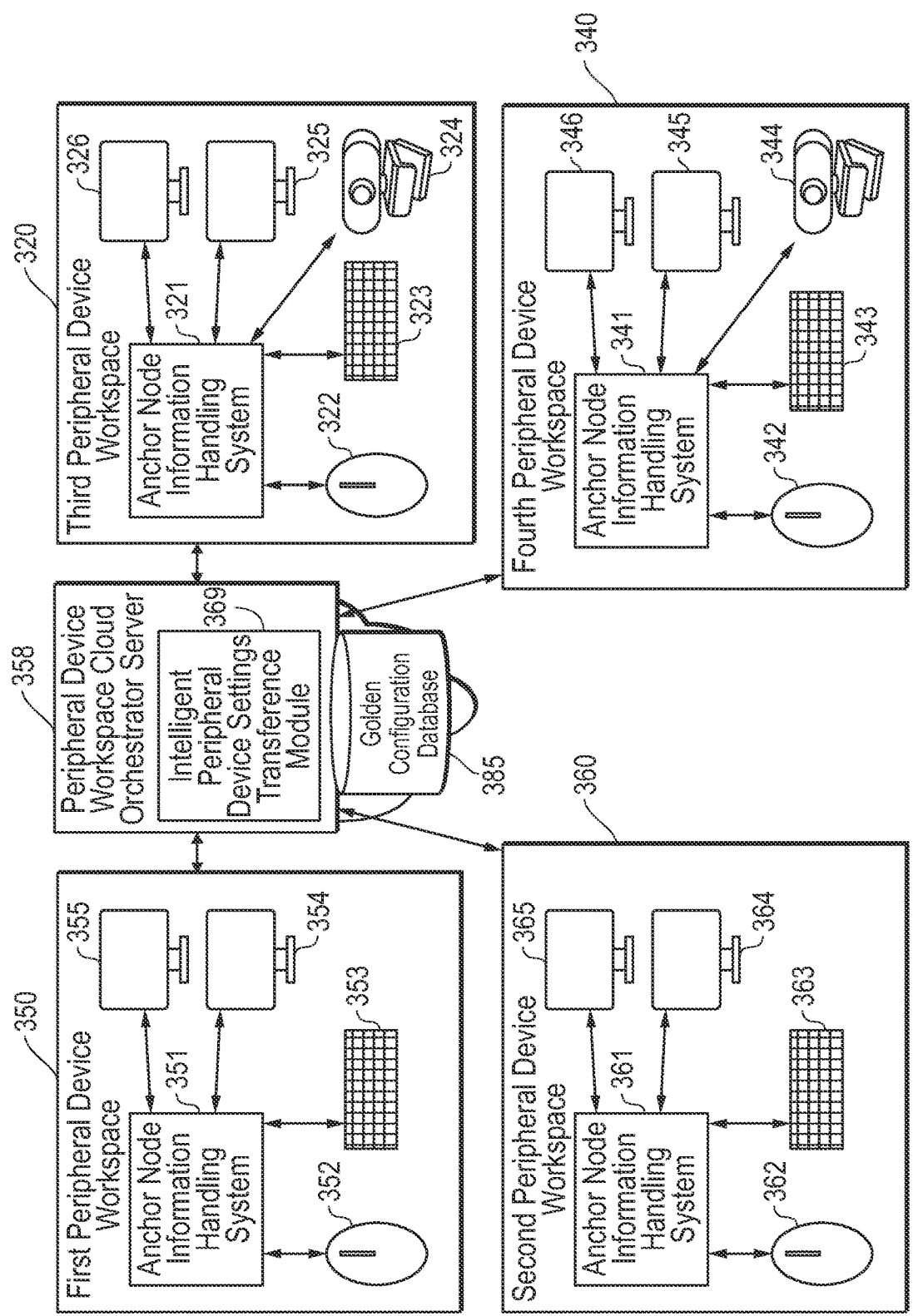
FIG. 3 is a block diagram illustrating execution of code instructions of an intelligent peripheral device setting transference module at a peripheral device workspace cloud orchestrator server for interfacing with a plurality of peripheral device workspaces incorporating various peripheral device nodes and associated with various usage patterns according to an embodiment of the present disclosure.

FIG. 3 is a block diagram illustrating execution of code instructions of an intelligent peripheral device setting transference module 369 at a peripheral device workspace cloud orchestrator server 358 for interfacing a plurality of peripheral device workspaces incorporating a plurality of peripheral devices of various types and associated with various usage patterns according to an embodiment of the present disclosure. As described herein, when users shift from a first peripheral device workspace, such as 350 to a second peripheral device workspace, such as 320, 340, or 360, there is often a mismatch between the capabilities for the peripheral devices within these peripheral device workspaces. Code instructions for the intelligent peripheral device settings transference module 369 in an embodiment may execute a clustering algorithm at a peripheral device workspace cloud orchestrator server 358 to group peripheral device workspaces, such as 320, 340, 350, or 360 undergoing similar usage patterns together in embodiment. As described herein, execution of code instructions for the intelligent peripheral device settings transference module 369 may determine a usage pattern for a peripheral device in a peripheral device workspace from a combination of peripheral device operational telemetry data readings describing the operational environment or current usage pattern for the anchor node information handling system, such as 321, in peripheral device workspace 320 (e.g., applications executing, hardware resource consumption rates, etc.). Further, instructions for the intelligent peripheral device settings transference module 369 are executed to determine the usage pattern from the adjustable operational configurations for each of the plurality of peripheral device nodes, such as 322, 323, 324, 325, and 326, are operatively coupled to the anchor node 321 directing the ways in which such peripheral device nodes 322, 323, 324, 325 and 326 may operate. In other words, a usage pattern determined may connect the ways in which a user is using an anchor node information handling system 321 with the ways in which the peripheral devices 322, 323, 324, 325, and 326 are operating to support such usage of the anchor node 321 by the user.

A clustering algorithm is executed as part of the code instructions for the intelligent peripheral device settings transference module 369 in an embodiment, such as a density-based (e.g., K-nearest neighbor), distribution-based, centroid-based, or hierarchical-based clustering, or other algorithms for example, to analyze received peripheral device operational telemetry data readings across a plurality of peripheral device workspaces, such as 320, 340, and 360 for a plurality of users who may be using these peripheral device workspaces 320, 340, and 360 in a variety of ways. For example, users may use some peripheral device workspaces for personal use, for design and development of computer code, for three-dimensional graphical design, for gaming, for participation in videoconferencing, for presenting information to a group or audience, or for other usage categories.

The operational telemetry data readings for an anchor node information handling system, such as 321 describing its usage pattern, models, types and combinations of peripheral device nodes, such as 322, 323, 324, 325, and 326, as well as ranges of functional capabilities and adjustable operational configurations selected from within those ranges for each of the peripheral devices 322, 323, 324, 325, and 326 may be fed into a clustering algorithm executing with code instructions for the intelligent peripheral device settings transference module 369 at peripheral device workspace cloud orchestrator server 358 in an embodiment. This may be performed for each of the peripheral device workspaces 320, 340, and 360 in an embodiment. Code instructions for the clustering algorithm of the intelligent peripheral device settings transference module 369 in an embodiment may then execute to identify one or more usage categories into which each of the plurality of peripheral device workspaces 320, 340, and 360 from which such operational telemetry data readings were gathered can be grouped. For example, the instructions for the clustering algorithm of the intelligent peripheral device settings transference module 369 in an embodiment may then execute to identify a single usage category that includes each of the peripheral device workspaces 320, 340, and 360.

Peripheral device workspace 320 in an example embodiment may include anchor node 321, mouse 322, keyboard 323, a webcam 324, a first external display device 325, and a second external display device 326. Each of these peripheral device nodes 321, 322, 323, 324, 325, and 326 in such an embodiment may be operatively coupled to the anchor node 321, and may each operate according to a range of functional capabilities. More specifically, the mouse 322 in example embodiment may include a range of possible polling rates, button detection sensitivity levels, or power source levels. As another example, the keyboard 323 in example embodiment may include a range of possible keypress detection sensitivity levels, status of a background LED, or power source levels. In yet another example, the external display device 325 and 326 may include a range of possible display resolution, display refresh rate, brightness, contrast, color gamut, horizontal view angle, vertical view angle, and response time. In still another example, the webcam 324 in an embodiment may include a range of possible audio/visual connection type (e.g., HDMI, digital audio, etc.), video capture resolution, image depth, video capture refresh rate, or captured frames per second.

Similar types of functional capabilities may also apply to other peripheral device workspaces 340 and 360 analyzed by the clustering algorithm. For example, the mouse 342 in peripheral device workspace 340 and the mouse 362 in the peripheral device workspace 360 in an example embodiment may also include a range of possible polling rates, button detection sensitivity levels, or power source levels. As another example, the keyboard 343 in peripheral device workspace 340 and the mouse 363 in the peripheral device workspace 360 in an example embodiment may also include a range of possible keypress detection sensitivity levels, status of a background LED, or power source levels. In yet another example, the external display devices 345 and 346 in peripheral device workspace 340 or external display device 364 and 365 in the peripheral device workspace 360 may include a range of possible display resolution, display refresh rate, brightness, contrast, color gamut, horizontal view angle, vertical view angle, and response time. In still another example, the webcam 344 in an embodiment may include a range of possible audio/visual connection type (e.g., HDMI, digital audio, etc.), video capture resolution, image depth, video capture refresh rate, or captured frames per second.

Each of the peripheral device nodes may also be configured according to an adjustable operational configuration selected by a user from within the range of functional capabilities for that peripheral device. For example, each of the peripheral device nodes 321, 322, 323, 324, 325, and 326 in peripheral device workspace 320 an embodiment may be configured according to an adjustable operational configuration selected by a user from within the range of functional capabilities for that peripheral device node 321, 322, 323, 324, 325, or 326, respectively. More specifically, the mouse 322 in example embodiment may be configured according to an adjustable operational configuration selected by a user from within the range of possible polling rates, button detection sensitivity levels, or power source levels. As another example, the keyboard 323 in example embodiment may be configured according to an adjustable operational configuration selected by a user from within the range of possible keypress detection sensitivity levels, status of a background LED, or power source levels. In yet another example, the external display device 325 and 326 may be configured according to an adjustable operational configuration selected by a user from within the range of possible display resolution, display refresh rate, brightness, contrast, color gamut, horizontal view angle, vertical view angle, and response time. In still another example, the webcam 324 in an embodiment may be configured according to an adjustable operational configuration selected by a user from within the range of possible audio/visual connection type (e.g., HDMI, digital audio, etc.), video capture resolution, image depth, video capture refresh rate, or captured frames per second.

Other peripheral device workspaces 340 and 360 analyzed by execution of the clustering algorithm from code instructions for the intelligent peripheral device settings transference module 369 in an embodiment may also be configured according to similar adjustable operational configurations. For example, the mouse 342 in peripheral device workspace 340 and the mouse 362 in the peripheral device workspace 360 in an example embodiment may also be configured according to an adjustable operational configuration selected by a user from within the range of possible polling rates, button detection sensitivity levels, or power source levels. As another example, the keyboard 343 in peripheral device workspace 340 and the mouse 363 in the peripheral device workspace 360 in an example embodiment may also be configured according to an adjustable operational configuration selected by a user from within the range of possible keypress detection sensitivity levels, status of a background LED, or power source levels. In yet another example, the external display devices 345 and 346 in peripheral device workspace 340 or external display device 364 and 365 in the peripheral device workspace 360 may be configured according to an adjustable operational configuration selected by a user from within the range of possible display resolution, display refresh rate, brightness, contrast, color gamut, horizontal view angle, vertical view angle, and response time. In still another example, the webcam 344 in an embodiment may be configured according to an adjustable operational configuration selected by a user from within the range of possible audio/visual connection type (e.g., HDMI, digital audio, etc.), video capture resolution, image depth, video capture refresh rate, or captured frames per second.

Execution of code instructions for the intelligent peripheral device settings transference module 369 may define one or more usage categories from one or more anchor node operational telemetry data readings describing usage of that anchor node, including, for example, software applications executing, battery power available, availability of connectivity to the internet or peripheral devices via any of a plurality of communication protocols, time of day, or even scheduled appointments or meetings stored in a calendar application. The code instructions for the intelligent peripheral device settings transference module 369 may execute to define a usage category by the model, type, or combination of peripheral devices operatively coupled to the anchor node, for example. In one example embodiment, the usage category determined by execution of code instructions for the intelligent peripheral device settings transference module 369 to include peripheral device workspaces 320, 340, and 360 may be defined by operative coupling with an anchor node, such as 321, 341, or 361, with a mouse, such as 322, 342, or 362, respectively, a keyboard, such as 323, 343, or 363, respectively, and one or more external display devices, such as 325, 326, 345, 346, 364, or 365, respectively such that one or more of the above node combinations in a peripheral device workspace may fall under or be adjusted to fall under a usage category.

Execution of code instructions of the intelligent peripheral device settings transference module 369 may further assess ranges of functional capabilities and adjustable operational configurations selected from within these ranges for each of the peripheral device nodes within a given peripheral device workspace to further define when a peripheral device workspace may be adjusted to fall within a particular usage category in embodiments herein. For example, the usage category determined to include peripheral device workspaces 320, 340, and 360 may be defined by adjustability of configurations or settings within at least one range of functional capabilities shared across all of the peripheral devices of a specific peripheral device type (e.g. mouse, keyboard, or external display device) of each of the peripheral device workspaces included within the usage category that also defines the usage category. More specifically, the usage category determined by execution of the code instructions for the intelligent peripheral device settings transference module 369 to include peripheral device workspaces 320, 340, and 360 may be defined by at least one of range of possible polling rates, button detection sensitivity levels, or power source levels shared by each of the mouse 322, 342, and 362. In another example, the usage category determined to include peripheral device workspaces 320, 340, and 360 may be defined by at least one of range of possible keypress detection sensitivity levels, status of a background LED, or power source levels shared by each of the keyboards 323, 343, and 363. In yet another example, the usage category determined to include peripheral device workspace 320, 340 and 360 may be defined by at least one range of possible display resolution, display refresh rate, brightness, contrast, color gamut, horizontal view angle, vertical view angle, and response time shared by at least one of the external displays 325 or 326, at least one of the external displays 345 or 346, and at least one of the external displays 364 or 365. The ranges of functional capabilities for peripheral devices may be excerpted from such received documents and stored at a cloud-based golden configuration database 385, along with an identification of the peripheral devices make, model, type of those peripheral devices, and peripheral device workspace identification value for the peripheral device workspace in which it is included.

Adjustable operational configurations selected from within these ranges for each of the peripheral devices within a given peripheral device workspace may further define the usage category during execution of code instructions for the intelligent peripheral device settings transference module 369 in embodiments herein. For example, the usage category determined to include peripheral device workspaces 320, 340, and 360 may be defined by at least one adjustable operational configuration selected from within the range of functional capabilities shared across all of the peripheral devices of a specific peripheral device type (e.g. mouse, keyboard, or external display device) of each of the peripheral device workspaces included within the usage category that also defines the usage category. More specifically, the usage category determined to include peripheral device workspaces 320, 340, and 360 may be defined by at least one adjustable operational configuration selected from within the range of possible polling rates, button detection sensitivity levels, or power source levels shared by each of the mouse 322, 342, and 362. In another example, the usage category determined to include peripheral device workspaces 320, 340, and 360 may be defined by at least one adjustable operational configuration selected from within the range of possible keypress detection sensitivity levels, status of a background LED, or power source levels shared by each of the keyboards 323, 343, and 363. In yet another example, the usage category determined to include peripheral device workspace 320, 340 and 360 may be defined by at least one adjustable operational configuration selected from within the range of possible display resolution, display refresh rate, brightness, contrast, color gamut, horizontal view angle, vertical view angle, and response time shared by at least one of the external displays 325 or 326, at least one of the external displays 345 or 346, and at least one of the external displays 364 or 365.

Each usage category determined by execution of code instructions for the clustering algorithm of the intelligent peripheral device settings transference module 369 in an embodiment may thus be defined by a combination of anchor node operational telemetry data readings, descriptors of a plurality of peripheral device nodes included within each peripheral device workspace having the assigned usage category (e.g., by make, model, type), and functional capabilities and adjustable operational configurations for those peripheral device nodes. A usage category in an embodiment may include only one of each of these attributes, such as a single anchor operational telemetry data reading (e.g., a specific application being executed), a single type of peripheral device (e.g., an external display device), one range of functional capabilities (e.g., a range of available display resolutions) and a single adjustable operational configuration (e.g., a specific display resolution of 4K Ultra-High Definition resolution). For example, the usage category defined by execution of code instructions for the intelligent peripheral device settings transference module 369 to include peripheral device workspaces 320, 340 and 360 may include a single operational telemetry reading indicating that the user of the anchor node 321, 341, or 361 is currently executing a computer code development program, one range of functional capabilities for external display devices, such as 325, 345, and 365 allowing each of these devices 325, 345, and 365 to display at a resolution between 720p and High-Definition (HD), and one adjustable operational configuration configuring each of those devices 325, 345, and 365 to display at an HD resolution. In such an embodiment, any peripheral device workspace that includes an anchor node executing a computer code development program operatively coupled to an external display device having that specific range of display resolutions and configured to display in HD resolution could be assigned to this usage category, for example. Again, this usage categories may be associated with anticipated or currently executing software applications executing at an anchor information handling system node or other usage in the new, destination peripheral device workspace upon transfer by the user in embodiments herein.

In another example embodiment herein, a usage category defined to include peripheral device workspaces 320, 340 and 360 in an embodiment herein may include a plurality of anchor operational telemetry data readings (e.g., a specific application being executed, a specific time of day, and a certain amount of battery power remaining), a plurality of peripheral devices (e.g., an external display device, a mouse, and a keyboard), and for each of these peripheral devices, a range of functional capabilities (e.g., a range of available display resolutions for the display device, a range of polling rates for the mouse, and a range of keystroke or button detection for the keyboard) and a single adjustable operational configuration (e.g., a specific display resolution of 4K Ultra-High Definition resolution, a specific polling rate for the mouse, and a specific keystroke or button detection value for the keyboard). Definition of such usage categories for a given peripheral device workspace in embodiments herein may thus result in identification by code instructions for the intelligent peripheral device settings transference module 369 of other peripheral device workspaces having one or more of the same usage categories, either belonging to the same user or multiple users, that have similar peripheral devices configured in similar ways, to support similar workloads or usage patterns at an anchor node. Each peripheral device workspace analyzed in such a way by the clustering algorithm of the code instructions for the intelligent peripheral device settings transference module 369 in an embodiment may be associated with a usage category identifier within the definition of that peripheral device workspace, and such a usage category identifier may also be associated with the user of that peripheral device workspace within that user's xID.

Code instructions for the cloud manageability orchestration module may execute in an embodiment to determine, based on receipt of updated peripheral device workspace anchor node status update document, that a user associated with user composite peripheral device identifier has moved from a first peripheral device workspace with a first peripheral device workspace identification value to a second peripheral device workspace with a second peripheral device workspace identification value. For example, as described with reference to FIG. 2, above, each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator. Thus, when a user enters the peripheral device workspace 350 and operatively couples the anchor node 351 to each of the peripheral devices 352, 353, 354, and 355, the anchor node 351 may transmit such a peripheral device workspace anchor node status update document identifying the current peripheral device workspace 350 for the user of the anchor node 351.

When the user moves from a previous peripheral device workspace, such as 320, 340 or 360, or another peripheral device workspace not grouped in the same usage category, to a new, current peripheral device workspace 350 in an embodiment, code instructions for the intelligent peripheral device settings transference module 369 may execute to determine the usage category for the new, current peripheral device workspace 350. This may be done through application of the clustering algorithm of the code instructions for the intelligent peripheral device settings transference module 369 to the new, current peripheral device workspace operational telemetry data readings, or through comparison of those readings with operational telemetry data readings shared by any of peripheral device workspaces 320, 340, and 360 that were previously grouped together into a usage category by the clustering algorithm. In other words, a previously defined usage category may include any plurality of peripheral device workspaces 320, 340 and 360, each having anchor nodes experiencing similar workloads and similar peripheral devices or identical types of peripheral devices, all configured according to matching adjustable operational configurations. Code instructions of the intelligent peripheral device settings transference module 369 in an embodiment may assign a current peripheral device workspace 350 to a previously defined usage category, such as that assigned to peripheral device workspaces 320, 340 and 360 in one embodiment, based on similarity between the anchor node workloads, peripheral device types included, range of functional capabilities, and adjustable operational configurations for those peripheral devices defining that usage category and the anchor node 351 workloads, peripheral device types included, range of functional capabilities, and adjustable operational configurations for those peripheral devices 352, 353, 354, and 355 for the new, current peripheral device workspace 350.

In some cases, the anchor node 351 workloads, peripheral device types included, range of functional capabilities, and adjustable operational configurations for those peripheral devices 352, 353, 354, and 355 for the current peripheral device workspace 350 may only partially match these attributes as defining the usage category during executing of the clustering algorithm of the intelligent peripheral device settings transference module 369. For example, execution of code instructions for the intelligent peripheral device settings transference module 369 applied to the current peripheral device workspace 350 operational telemetry data readings may indicate only a partial match or overlap to the usage category defining plurality of anchor node 321, 341, and 361 workloads, plurality of peripheral device types included, or range of functional capabilities, and adjustable operational configurations for those peripheral device nodes, such as 322, 323, 324, 325, 326, 342, 343, 344, 345, 346, 362, 363, 364, and 365. Code instructions for the intelligent peripheral device settings transference module 369 in an embodiment may assign a usage category comparison similarity value to each peripheral device workspace, such as 350, indicating overlap assigned to an existing usage category in such a case. In some embodiments, one or more anchor node 321, 341, and 361 workloads, plurality of peripheral device types included, or range of functional capabilities, and adjustable operational configurations for peripheral device node may be weighted based on importance or utilization by executing software applications on an anchor node when operating within a usage category. For example, a usage category for conducting videoconferencing may include a higher weighting value assigned to a webcam peripheral device node and any range of functional capabilities and adjustable operational configurations for the same in one example embodiment. This usage category comparison similarity value in an embodiment may describe a percentage of the total number of anchor node 321, 341, and 351 workloads, peripheral device types included, range of functional capabilities, and adjustable operational configurations for those peripheral devices such as 322, 323, 324, 325, 326, 342, 343, 344, 345, 346, 362, 363, 364, and 365 defining the usage category, as may be weighted for the usage category in some embodiments, that are matched by operational telemetry data readings of the new, current peripheral device workspace 350.

Upon determination of a usage category for the current peripheral device workspace 350, code instructions for the intelligent peripheral device settings transference module 369 may execute in an embodiment to determine one or more adjustable operational configurations for one or more of the current peripheral devices 352, 353, 354, or 355 in the current peripheral device workspace based on the determined usage category. As described herein, a new, current peripheral device workspace 350 may be assigned to a previously defined usage category, such as the usage category defined to also include one or more of the peripheral device workspaces 320, 340, and 360, even if the anchor node workloads, peripheral device types included, range of functional capabilities, and adjustable operational configurations for those peripheral devices 352, 353, 354, or 355 for the current peripheral device workspace 350 are not an exact match with the anchor node workloads, peripheral device types included, range of functional capabilities, and adjustable operational configurations for those peripheral devices defining the usage category, as found in peripheral device workspaces 320, 340 and 360. In such a case, code instructions for the intelligent peripheral device settings transference module 369 may execute to determine differences in peripheral device functional capabilities between the current peripheral device workspace 350 and peripheral device functional capabilities defining the usage category.

For example, code instructions for the intelligent peripheral device settings transference module 369 may execute to determine a difference in peripheral device functional capabilities for the mouse 352 for the current peripheral device workspace 350 and at least one of a range of possible polling rates, button detection sensitivity levels, or power source levels shared by each of the mice 322, 342, and 362 that define the usage category to include peripheral device workspaces 320, 340 and 360. In another example, code instructions for the intelligent peripheral device settings transference module 369 may execute to determine a difference in peripheral device functional capabilities for the keyboard 353 for the current peripheral device workspace 350 and at least one of range of possible keypress detection sensitivity levels, status of a background LED, or power source levels shared by each of the keyboards 323, 343, and 363 that define the usage category to include peripheral device workspaces 320, 340 and 360. In yet another example, code instructions for the intelligent peripheral device settings transference module 369 may execute to determine a difference in peripheral device functional capabilities for each of the external display devices 354 and 355 for the current peripheral device workspace 350 and at least one of range of possible display resolution, display refresh rate, brightness, contrast, color gamut, horizontal view angle, vertical view angle, and response time shared by at least one of the external displays 325 or 326, at least one of the external displays 345 or 346, and at least one of the external displays 364 or 365 that define the usage category to include peripheral device workspaces 320, 340 and 360.

Configuring or using a peripheral device having a first range of functional capabilities according to an adjustable operational configuration previously applied to another peripheral device having a second range of functional capabilities may result in a less enjoyable or productive experience for the user when the ranges of adjustable operational configuration do not overlap. In contrast, some ranges of functional capabilities for peripheral devices defining the usage category may identically match or overlap those of the peripheral devices within the new, current peripheral device workspace. In such a case, it may be appropriate to configure the peripheral device(s) within the current peripheral device workspace having ranges of functional capabilities that match or overlap those given within the definition of the usage category according to the adjustable operational configurations for those peripheral devices, also given within the definition of the usage category by execution of code instructions for the intelligent peripheral device settings transference module 369.

The degree to which such a reconfiguration of the current peripheral device workspace peripheral devices is appropriate may depend in embodiments on the overall similarity or overlap between the current peripheral device workspace and the defined usage category. Thus, code instructions for the intelligent peripheral device settings transference module 369 may execute to automatically configure peripheral device nodes within the new, current peripheral device workspace according to the adjustable operational configurations for those peripheral devices given within the definition of the usage category if the usage category comparison similarity value indicating overlap described above meets a minimum threshold, such as 80%, 90%, 95%, etc. For example, code instructions for the intelligent peripheral device settings transference module 369 may execute to automatically configure the peripheral device(s), such as 352, 353, 354, or 355 within the current peripheral device workspace 355 according to the adjustable operational configurations for those peripheral device nodes having the same peripheral device type given within the definition of the usage category. More specifically, in an embodiment in which the mouse 352 has a range of functional capabilities that matches the range of functional capabilities for mice 322, 342, and 362 defining the assigned usage category for peripheral device nodes 320, 340, 350, and 360, and in which the usage category comparison similarity value described above meets the minimum threshold, any adjustable operational configurations for the mice 322, 342, and 362 that define the usage category may be automatically applied to the mouse 352. This may be accomplished by code instructions for the intelligent peripheral device settings transference module 369 instructing the anchor node 351 to apply such an adjustable operational configuration via the ecosystem manageability subagent (e.g., 290 of FIG. 2) of the anchor node 251 and the ecosystem manageability interface (e.g., 252 of FIG. 2) of the mouse 352.

In another example embodiment in which the keyboard 353 has a range of functional capabilities that matches or overlaps the range of functional capabilities for keyboards 323, 343, or 364 defining the assigned usage category for peripheral device nodes 320, 340, 350, and 360, and in which the usage category comparison similarity value indicating that overlap described above meets the minimum threshold, any adjustable operational configurations for the keyboards 323, 343, or 364 that define the usage category may be automatically applied to the keyboard 353. This may be accomplished by code instructions for the intelligent peripheral device settings transference module 369 instructing the anchor node 351 to apply such an adjustable operational configuration via the ecosystem manageability subagent (e.g., 290 of FIG. 2) of the anchor node 251 and the ecosystem manageability interface (e.g., 252 of FIG. 2) of the keyboard 353.

In yet another example embodiment in which one of the external display device 354 or 355 has a range of functional capabilities that matches or overlaps the range of functional capabilities for external display devices 325, 326, 345, 346, 364, or 365 defining the assigned usage category for peripheral device nodes 320, 340, 350, and 360, and in which the usage category comparison similarity value indicating that overlap described above meets the minimum threshold, any adjustable operational configurations for the external display devices 325, 326, 345, 346, 364, or 365 that define the usage category may be automatically applied to the external display 354 or 355. This may be accomplished by code instructions for the intelligent peripheral device settings transference module 369 instructing the anchor node 351 to apply such an adjustable operational configuration via the ecosystem manageability subagent (e.g., 290 of FIG. 2) of the anchor node 251 and the ecosystem manageability interface (e.g., 252 of FIG. 2) of the external display 354 or 355.

In cases where the usage category comparison similarity value minimum threshold is not met, code instructions for the intelligent peripheral device settings transference module 286 in an embodiment may execute to recommend that the user apply the adjustable operational configurations for a given peripheral device given within the definition of the usage category, instead of automatically applying such a configuration. For example, in an embodiment in which the mouse 352 has a range of functional capabilities that matches the range of functional capabilities for mice 322, 342, and 362 defining the assigned usage category for peripheral device nodes 320, 340, 350, and 360, but in which the usage category comparison similarity value does not meet the minimum threshold, any adjustable operational configurations for the mice 322, 342, and 362 that define the usage category may be recommended for application to the mouse 352 by the user of the anchor node 351. In another example embodiment in which the keyboard 353 has a range of functional capabilities that matches the range of functional capabilities for keyboards 323, 343, or 364 defining the assigned usage category for peripheral device nodes 320, 340, 350, and 360, but in which the usage category comparison similarity value does not meet the minimum threshold, any adjustable operational configurations for the keyboards 323, 343, or 364 that define the usage category may be recommended for application to the keyboard 353 by the user of the anchor node 351. In yet another example embodiment in which one of the external display device 354 or 355 has a range of functional capabilities that matches or overlaps the range of functional capabilities for external display devices 325, 326, 345, 346, 364, or 365 defining the assigned usage category for peripheral device nodes 320, 340, 350, and 360, but in which the usage category comparison similarity value does not meet the minimum threshold, any adjustable operational configurations for the external display devices 325, 326, 345, 346, 364, or 365 that define the usage category may be recommended for application to the external display 354 or 355 by the user. This may be accomplished by code instructions for the intelligent peripheral device settings transference module 369 instructing the anchor node 351 to recommend application of such an adjustable operational configuration via the ecosystem manageability subagent (e.g., 290 of FIG. 2) of the anchor node 251 and the ecosystem manageability interface (e.g., 252 of FIG. 2) of the external display 354 or 355.

Code instructions for the intelligent peripheral device settings transference module 369 may also execute to determine whether the user has accepted the recommended adjustable operational configurations described directly above. If the user does not accept such a recommended adjustable operational configuration, this may indicate that the user does not plan to use the peripheral device in the same way as other users have used similar peripheral devices under similar circumstances in the past or that the user experience is degraded somehow. In such a case, the clustering algorithm can be refined to more accurately predict the ways in which future users will wish to configure peripheral devices used in similar ways and under similar circumstances by feeding peripheral device operational telemetry data readings describing the usage pattern for the current peripheral device workspace and a user-adjusted operational configuration (e.g., selected by the user instead of the recommended adjustable operational configuration) back into the clustering algorithm of the code instructions for the intelligent peripheral device settings transference module 369. In such a way, the clustering algorithm for the intelligent peripheral device settings transference module 369 may be honed over time to more accurately predict the best operational configuration for a given peripheral device within a peripheral device workspace undergoing a specific usage pattern.

In other embodiments described herein, code instructions for the intelligent peripheral device settings transference module 369 may execute to determine significant differences in peripheral device functional capabilities between the new, current peripheral device workspace 350 and peripheral device functional capabilities defining the usage category. For example, code instructions for the intelligent peripheral device settings transference module 369 may execute to determine a difference in peripheral device functional capabilities for the mouse 352 for the current peripheral device workspace 350 and a range of possible polling rates shared by each of the mice 322, 342, and 362 that define the usage category to include peripheral device workspaces 320, 340 and 360. In another example, code instructions for the intelligent peripheral device settings transference module 369 may execute to determine a difference in peripheral device functional capabilities for the keyboard 353 for the current peripheral device workspace 350 and a range of possible keypress detection sensitivity levels shared by each of the keyboards 323, 343, and 363 that define the usage category to include peripheral device workspaces 320, 340 and 360. In yet another example, code instructions for the intelligent peripheral device settings transference module 369 may execute to determine a difference in peripheral device functional capabilities for each of the external display devices 354 and 355 for the current peripheral device workspace 350 and a range of possible display resolution shared by at least one of the external displays 325 or 326, at least one of the external displays 345 or 346, and at least one of the external displays 364 or 365 that define the usage category to include peripheral device workspaces 320, 340 and 360.

In such cases, it may be more appropriate to consider how other peripheral devices of the same type and having the same functional capabilities have been configured in the past when determining the best adjustable operational configuration for the current peripheral device workspace 350, rather than referencing the adjustable operational configuration defining the usage category. As described herein, the ranges of functional capabilities for peripheral devices may be excerpted from peripheral device workspace anchor node status update documents gathered from a plurality of peripheral devices workspaces over time and stored at a cloud-based golden configuration database 385, along with an identification of the peripheral device, make, model, type, and peripheral device workspace identification value for the peripheral device workspace in which it is included. Code instructions for the intelligent peripheral device settings transference module 369 in an embodiment may access this golden configuration database 385 to identify one or more peripheral devices of the same type as a given peripheral device within the current peripheral device workspace 350 that have ranges of functional capabilities that are identical to one or more of such ranges for the given peripheral device within the current peripheral device workspace.

For example, code instructions for the intelligent peripheral device settings transference module 369 may execute to identify a comparable mouse within the golden configuration database 385 having peripheral device functional capabilities that match the range of functional capabilities for the mouse 352 for the current peripheral device workspace 350. In another example, code instructions for the intelligent peripheral device settings transference module 369 may execute to identify a comparable keyboard within the golden configuration database 385 having peripheral device functional capabilities that match functional capabilities for the keyboard 353 for the current peripheral device workspace 350. In yet another example, code instructions for the intelligent peripheral device settings transference module 369 may execute to identify a comparable external display device within the golden configuration database 385 having peripheral device functional capabilities that match functional capabilities for one or both of the external display devices 354 and 355 for the current peripheral device workspace 350.

Code instructions for the intelligent peripheral device settings transference module 369 may execute to determine a difference in peripheral device functional capabilities for the mouse 352 for the current peripheral device workspace 350 and a range of possible polling rates shared by each of the mice 322, 342, and 362 that define the usage category to include peripheral device workspaces 320, 340 and 360. In another example, code instructions for the intelligent peripheral device settings transference module 369 may execute to determine a difference in peripheral device functional capabilities for the keyboard 353 for the current peripheral device workspace 350 and a range of possible keypress detection sensitivity levels shared by each of the keyboards 323, 343, and 363 that define the usage category to include peripheral device workspaces 320, 340 and 360. In yet another example, code instructions for the intelligent peripheral device settings transference module 369 may execute to determine a difference in peripheral device functional capabilities for each of the external display devices 354 and 355 for the current peripheral device workspace 350 and a range of possible display resolution shared by at least one of the external displays 325 or 326, at least one of the external displays 345 or 346, and at least one of the external displays 364 or 365 that define the usage category to include peripheral device workspaces 320, 340 and 360.

Such a golden configuration database 385 may further include a default configuration for each such peripheral device, as set according to a manufacturer's instructions for example, a laboratory-testing derived best configuration as provided by an information technology decision maker (ITDM), or a crowd-sourced best rated configuration determined based on peripheral device operational telemetry data readings across a plurality of peripheral device workspaces received over time. Upon identification of a comparable peripheral device in the golden configuration database having a range of functional capabilities that matches the range of functional capabilities for a given peripheral device node within the new, current peripheral device workspace, code instructions for the intelligent peripheral device settings transference module 369 in embodiments may execute to instruct the anchor node to recommend that the user apply an adjustable operational configuration associated with comparable peripheral device node identified within the golden configuration database, as described directly above. For example, code instructions for the intelligent peripheral device settings transference module 369 in an embodiment may execute to instruct the anchor node 351 to recommend that the user apply an adjustable operational configuration (e.g., default configuration, laboratory-tested best configuration, or crowd-source determined best configuration) associated with the identified comparable mouse identified within the golden configuration database 385 to the mouse 352 in the current peripheral device workspace 350. In another example embodiment, code instructions for the intelligent peripheral device settings transference module 369 in an embodiment may execute to instruct the anchor node 351 to recommend that the user apply an adjustable operational configuration associated with the identified comparable keyboard identified within the golden configuration database 385 to the keyboard 353 in the current peripheral device workspace 350. In yet another example embodiment, code instructions for the intelligent peripheral device settings transference module 369 in an embodiment may execute to instruct the anchor node 351 to recommend that the user apply an adjustable operational configuration associated with the identified comparable external display device identified within the golden configuration database 385 to the display device 354 or 355 in the current peripheral device workspace 350.

If the user does not accept this recommendation, the crowd-sourced best rated configuration may be adjusted based on this received user feedback. In such a way, code instructions for the intelligent peripheral device settings transference module may accurately predict the best operational configuration for a given peripheral device within a peripheral device workspace undergoing a specific usage pattern, and may either automatically institute such a configuration, or recommend that the user do so.

Figure 4:
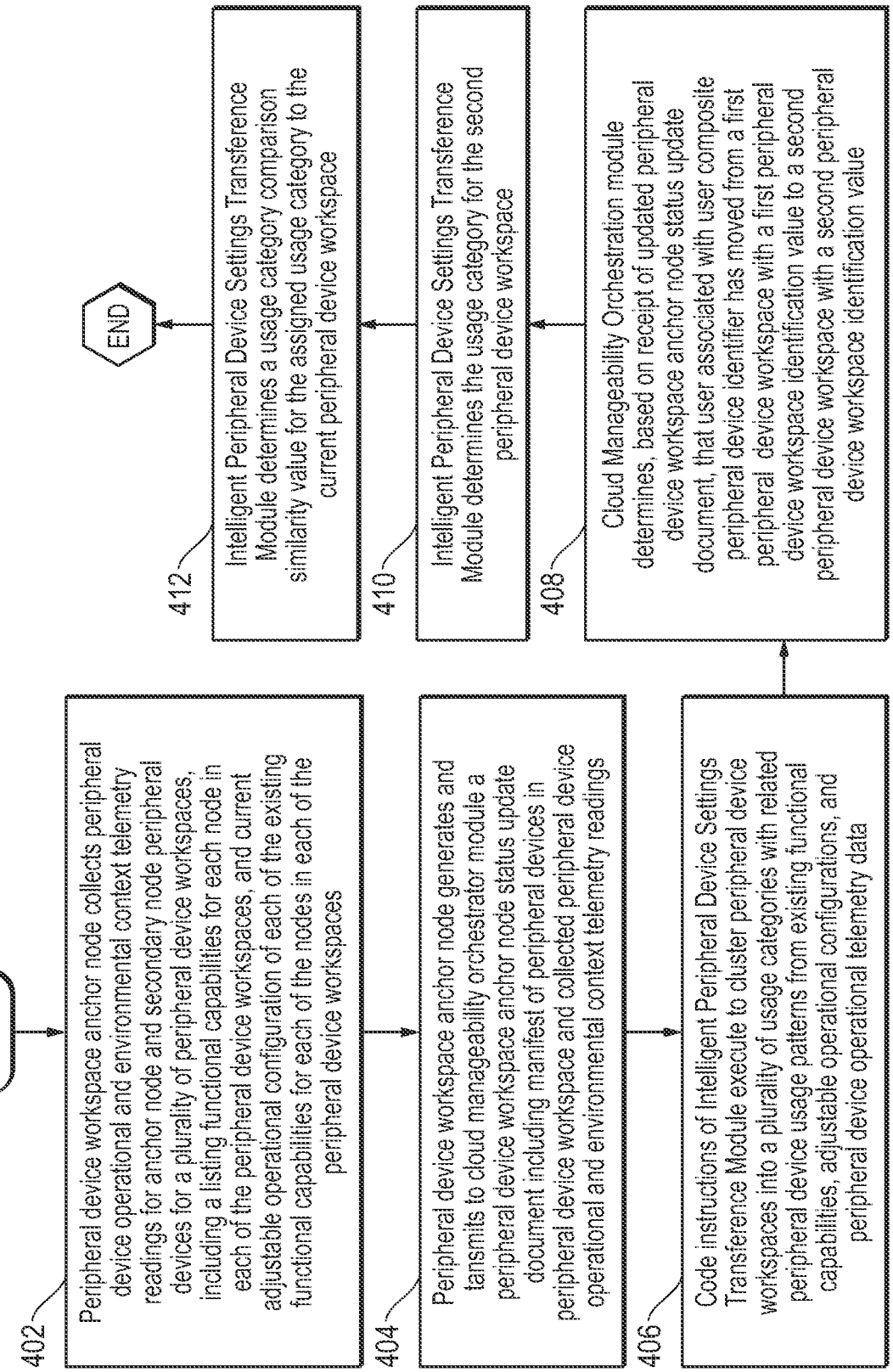
FIG. 4 is a flow diagram illustrating a method of executing code instructions of an intelligent peripheral device setting transference module at a peripheral device workspace cloud orchestrator for determining a usage category for predicting best adjustable operational configurations for one or more peripheral device nodes in a given peripheral device workspace according to an embodiment of the present disclosure.

FIG. 4 is a flow diagram illustrating a method of executing code instructions for the intelligent peripheral device settings transference module at a peripheral device workspace cloud orchestrator server for determining a usage category, defined by information handling system and peripheral device usage patterns, for predicting best adjustable operational configurations for one or more peripheral device nodes in a given peripheral device workspace based on shared or previously analyzed usage patterns according to an embodiment of the present disclosure. As described herein, when users shift from a first peripheral device workspace to a second peripheral device workspace, there is often a mismatch between the capabilities for the peripheral devices within these peripheral device workspaces. Code instructions for the intelligent peripheral device settings transference module in an embodiment may execute a clustering algorithm to group peripheral device workspaces undergoing similar usage patterns together for similar configuration of similar peripheral devices undergoing similar workloads. Execution of code instructions for the intelligent peripheral device settings transference module may determine one or more usage patterns from a combination of peripheral device operational telemetry data readings describing the operational environment or current usage pattern for the anchor node information handling system (e.g., applications executing, hardware resource consumption rates, etc.) and the adjustable operational configurations for each of the plurality of peripheral devices operatively coupled to that anchor node, directing the ways in which such peripheral devices may operate. In other words, a usage pattern may connect the ways in which a user is using an anchor node information handling system node with the ways in which the peripheral device nodes are operating to support such usage of the anchor node by the user at peripheral device workspaces according to embodiments herein.

At block 402, a peripheral device workspace anchor node in an embodiment may collect peripheral device operational telemetry data readings for the anchor node and secondary node peripheral devices for a plurality of peripheral device workspaces over time and store the same associated with those peripheral device workspace identification values in a peripheral device workspace management system database at one or more peripheral device workspace orchestrator servers. This may include a list of existing functional capabilities for each device node in each of the existing peripheral device workspaces, and current adjustable operational configuration of each of the existing functional capabilities for each of the device nodes in each of the peripheral device workspaces stored in the database with the peripheral device workspace identification value for each peripheral device workspace where and when communication and retrieval of such environmental context telemetry data or operational configuration data is available. For example, as described in an embodiment with respect to FIG. 1, peripheral device operational telemetry data readings gathered pursuant to execution of code instructions for an eccosystem manageability sub-agent 172 in an embodiment may include, for example, information specific to the information handling system 100, or the operative connection between the information handling system 100 and the peripheral devices 142 when in one or another peripheral device workspace. More specifically, the peripheral device operational telemetry data readings gathered pursuant to execution of code instructions for the ecosystem manageability sub-agent may include, for the information handling system 100, a current power mode (e.g., sleep mode, battery mode, operational mode, powered down), range of possible power modes, current time, geographic location for the peripheral device workspace that includes the information handling system 100, current execution of a specific software application, hardware processor 102 or 104 utilization rate, memory 106, 108, or 120 utilization rate, remaining battery power for battery 124. In another example embodiment, the peripheral device operational telemetry data readings gathered pursuant to execution of code instructions for the ecosystem manageability sub-agent 172 may include measured values for the wired or wireless link operatively coupling the one or more of the peripheral devices 142 to the information handling system 100, such as throughput metric, received signal strength indicator (RSSI), wireless protocol (e.g., WLAN, WWAN, WPAN, Bluetooth®, BLE), or measured number of dropped packets.

In another example embodiment described with respect to FIG. 2, code instructions for the ecosystem manageability sub-agent 290 in an embodiment may execute to gather, via an ecosystem manageability interface 252 at one or more secondary node peripheral devices, various peripheral device operational telemetry data readings describing operational capabilities for the one or more secondary node peripheral devices such as 251 within the peripheral device workspace 250, as well as adjustable operational configurations for those operational capabilities. For example, in an embodiment in which the peripheral device 251 is an external display device, the code instructions of the ecosystem manageability sub-agent 290 may execute to gather peripheral device operational telemetry data readings including a current adjustable operational configuration at the peripheral device 251 for display resolution, display refresh rate, brightness, contrast, color gamut, horizontal view angle, vertical view angle, and response time. As another example, in an embodiment in which the peripheral device 251 is an external webcam, the code instructions for the ecosystem manageability sub-agent 290 may execute to gather peripheral device operational telemetry data readings including a current adjustable operational configuration at the peripheral device 251 for audio/visual connection type (e.g., HDMI, digital audio, etc.), video capture resolution, image depth, video capture refresh rate, or captured frames per second. In still another example, in an embodiment in which the peripheral device 251 is an external microphone, code instructions for the ecosystem manageability sub-agent 290 may execute to gather peripheral device operational telemetry data readings including a current adjustable operational configuration at the peripheral device 251 for audio output type, audio output frequency, or audio filters (e.g., noise reduction). In yet another example embodiment, in which the peripheral device 251 is an external speaker, code instructions for the ecosystem manageability sub-agent 290 may execute to gather peripheral device operational telemetry data readings including a current adjustable operational configuration at the peripheral device 251 for audio input type, and audio input frequency.

Code instructions for the ecosystem manageability sub-agent executing at the anchor node in an embodiment may also execute to retrieve functional capabilities for the peripheral devices from each of the operatively coupled peripheral devices in each of a plurality of peripheral device workspaces. For example, the code instructions for the ecosystem manageability sub-agent 290 operating at the anchor node 230 may execute to gather peripheral device operational telemetry data readings regarding the range of capabilities for each peripheral device (e.g., 251 and 254). The information defining the range of functional capabilities for the peripheral device 251 may be stored at the peripheral device 251, within the firmware 253. In another embodiment, range of functional capabilities for the peripheral device 251 may be stored at an orchestration device descriptor (ODD) service 255. In an embodiment, the ODD service 255 for the peripheral device 251 may also store static or non-adjustable features for the peripheral device 251, such as locations for various ports, physical dimensions of the new peripheral device 251, or physical locations for internal components such as an embedded camera. Model number, device number, media access control (MAC) address, or other identifying information for the peripheral device 251 may also be stored within the ODD service 255, while similar identifying information for the peripheral device 251 in an embodiment may be stored within firmware 253.

The ecosystem manageability sub-agent 290 of the anchor node information handling system 230 may execute code instructions in an embodiment to retrieve the functional capabilities for the peripheral device 251 from the firmware 253 via communication with the ecosystem manageability interface 252, which may act as an application programming interface (API), for example, between the firmware 253 and the ecosystem manageability sub-agent 290. The code instructions for the ecosystem manageability sub-agent 290 at the anchor node information handling system 230 in another embodiment may execute to gather the functional capabilities for the peripheral device 251 from the ODD service 255 via the ecosystem manageability interface 252, which may also act as an API between the ODD service 255 and the ecosystem manageability sub-agent 290. The ODD may include a unique peripheral device identification as well as an environmental telemetry data set describing the peripheral device operational telemetry data readings regarding the range of capabilities for each peripheral device (e.g., 251 and 254).

The peripheral device workspace anchor node in an embodiment at block 404 may generate and transmit to the cloud manageability orchestrator module executing at a peripheral device workspace cloud orchestrator server a peripheral device workspace anchor node status update document including manifest of peripheral devices in peripheral device workspace and collected peripheral device operation and environmental context telemetry data readings for a peripheral device workspace location identified by a location identifier. For example, in an embodiment described with respect to FIG. 1, code instructions for the ecosystem manageability sub-agent 172 executing at the information handling system 100 in a peripheral device workspace may create a manifest of peripheral device nodes 142 and other nodes for a peripheral device workspace identification value to represent the current peripheral device workspace (e.g., 250 or 260 in FIG. 2), including an identification of the location, and an identification (e.g., by product serial number or other peripheral device identification) of each of the peripheral device nodes 142 connected to or operably coupled to the anchor information handling system 100 at a peripheral device workspace.

The hardware processor 102 of the user anchor information handling system 100 may execute code instructions of the ecosystem manageability sub-agent 172 to also collect one or more peripheral device operational telemetry data readings (e.g., time, applications executing, hardware component usage metrics, or other telemetry data indicating usage patterns for the information handling system 100 or various peripheral device nodes 142 in a peripheral device workspace). The manifest of peripheral device nodes and other nodes as well as location of a peripheral device workspace described above may be combined with the peripheral device operational telemetry data readings for the peripheral device workspace and an identification of the anchor node information handling system 100 user into a peripheral device workspace anchor node status update document written in a machine-readable language or machine markup language such as JavaScript Object Notation (JSON), for example, to be associated with a peripheral device workspace identification value.

This peripheral device workspace anchor node status update document is transmitted for storage with the peripheral device workspace identification value at a peripheral device workspace management system database 167 operating at the peripheral device workspace cloud orchestrator server 158. Each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator 156 for association with the peripheral device workspace identification value for the peripheral device workspace. Additionally, values for the ODD of each peripheral device in the manifest of peripheral devices in the peripheral device workspace may also be updated with these changes. Similarly, a given set of configuration settings operated by a user for a period of time may establish an xID for the user's user composite peripheral device workspace identifier to record usages of the peripheral devices by a user in a peripheral device workspace.

At block 406, code instructions for the intelligent peripheral device settings transference module in an embodiment may execute to cluster peripheral device workspaces into a plurality of usage categories defining similar peripheral device usage patterns, based on existing functional capabilities, adjustable operational configurations, and peripheral device operational telemetry data readings. For example, in an embodiment described with reference to FIG. 3, a clustering algorithm of the code instructions for the intelligent peripheral device settings transference module 369, such as a density-based (e.g., K-nearest neighbor), distribution-based, centroid-based, or hierarchical-based clustering algorithm, for example, may execute to analyze received peripheral device operational telemetry data readings across a plurality of peripheral device workspaces, such as 320, 340, and 360 for a plurality of users who may be using these peripheral device workspaces 320, 340, and 360 in a variety of ways.

The operational telemetry data readings for an anchor node information handling system, such as 321 describing its usage pattern, models, types and combinations of peripheral device nodes, such as 322, 323, 324, 325, and 326, as well as ranges of functional capabilities and adjustable operational configurations selected from within those ranges for each of the peripheral devices 322, 323, 324, 325, and 326 may be fed into a clustering algorithm executing as part of the code instructions for the intelligent peripheral device settings transference module 369 in an embodiment. This may be performed for each of the peripheral device workspaces 320, 340, and 360 in an embodiment. Code instructions for the clustering algorithm of the intelligent peripheral device settings transference module 369 in an embodiment may then execute to identify one or more usage categories into which each of the plurality of peripheral device workspaces 320, 340, and 360 from which such operational telemetry data readings were gathered can be grouped. For example, the instructions for the clustering algorithm of the intelligent peripheral device settings transference module 369 in an embodiment may then execute to identify a single usage category that includes each of the peripheral device workspaces 320, 340, and 360.

The code instructions for the intelligent peripheral device settings transference module 369 may execute to define a usage category based on one or more anchor node operational telemetry data readings describing usage of that anchor node, including, for example, software applications executing, battery power available, availability of connectivity to the internet or peripheral devices via any of a plurality of communication protocols, time of day, or even scheduled appointments or meetings stored in a calendar application. The usage category may also be defined by the model, type, or combination of peripheral devices operatively coupled to the anchor node, for example. More specifically, the usage category determined to include peripheral device workspaces 320, 340, and 360 may be defined by operative coupling with an anchor node, such as 321, 341, or 361 with a mouse, such as 322, 342, or 362 respectively, a keyboard, such as 323, 343, or 363 respectively, and one or more external display devices, such as 325, 326, 345, 346, 364, or 365 respectively that fall within an identified usage category upon execution of code instructions for clustering algorithm of the intelligent peripheral device settings transference module 369. It is appreciated that the clustering algorithm may execute to determine some subset of peripheral device workplaces 321, 341, or 361 above or some subset of their peripheral device nodes may not fall into a usage category as defined by execution of the code instructions for the intelligent peripheral device settings transference module 369 in other embodiments.

Ranges of functional capabilities and adjustable operational configurations selected from within these ranges for each of the peripheral devices within a given peripheral device workspace may further define the usage category in embodiments herein. For example, the usage category determined to include peripheral device workspaces 320, 340, and 360 may be defined by at least one range of functional capabilities shared across all of the peripheral devices of a specific peripheral device type (e.g. mouse, keyboard, or external display device) of each of the peripheral device workspaces included within the usage category that also defines the usage category. More specifically, the usage category determined to include peripheral device workspaces 320, 340, and 360 may be defined by at least one of range of possible polling rates, button detection sensitivity levels, or power source levels shared by each of the mouse 322, 342, and 362. In another example, the usage category determined to include peripheral device workspaces 320, 340, and 360 may be defined by at least one of range of possible keypress detection sensitivity levels, status of a background LED, or power source levels shared by each of the keyboards 323, 343, and 363. In yet another example, the usage category determined to include peripheral device workspace 320, 340 and 360 may be defined by at least one range of possible display resolution, display refresh rate, brightness, contrast, color gamut, horizontal view angle, vertical view angle, and response time shared by at least one of the external displays 325 or 326, at least one of the external displays 345 or 346, and at least one of the external displays 364 or 365. The ranges of functional capabilities for peripheral devices may be excerpted from such received documents and stored at a cloud-based golden configuration database 385, along with an identification of the peripheral devices make, model, type of those peripheral devices, and peripheral device workspace identification value for the peripheral device workspace in which it is included.

Adjustable operational configurations selected from within these ranges for each of the peripheral device nodes within a given peripheral device workspace may further define the usage category in embodiments herein. For example, the usage category determined to include peripheral device workspaces 320, 340, and 360 may be defined by at least one adjustable operational configuration selected from within the range of functional capabilities shared across all of the peripheral devices of a specific peripheral device type (e.g. mouse, keyboard, or external display device) of each of the peripheral device workspaces included within the usage category that also defines the usage category. Thus, the operation configurations may be adjusted within the ranges for one or more peripheral device nodes such that the adjustment causes the peripheral device workspace having those peripheral device nodes to be able to fit within a usage category as determined by execution of code instructions for the intelligent peripheral device settings transference module 369.

More specifically, the usage category determined to include peripheral device workspaces 320, 340, and 360 may be defined by at least one adjustable operational configuration selected from within the range of possible polling rates, button detection sensitivity levels, or power source levels shared by each of the mouse 322, 342, and 362. In another example, the usage category determined to include peripheral device workspaces 320, 340, and 360 may be defined by at least one adjustable operational configuration selected from within the range of possible keypress detection sensitivity levels, status of a background LED, or power source levels shared by each of the keyboards 323, 343, and 363. In yet another example, the usage category determined to include peripheral device workspace 320, 340 and 360 may be defined by at least one adjustable operational configuration selected from within the range of possible display resolution, display refresh rate, brightness, contrast, color gamut, horizontal view angle, vertical view angle, and response time shared by at least one of the external displays 325 or 326, at least one of the external displays 345 or 346, and at least one of the external displays 364 or 365.

Each usage category determined by execution of code instructions for the clustering algorithm of the intelligent peripheral device settings transference module in an embodiment may thus be defined by a combination of anchor node operational telemetry data readings, descriptors of a plurality of peripheral devices included within each peripheral device workspace having the assigned usage category (e.g., by make, model, type), and functional capabilities and adjustable operational configurations for those peripheral devices. A usage category in an embodiment may include one or more of each of these attributes, such as one or more anchor operational telemetry reading (e.g., a specific application being executed), one or more type of peripheral device (e.g., an external display device), one or more range of functional capabilities (e.g., a range of available display resolutions) and a single adjustable operational configuration (e.g., a specific display resolution of 4K Ultra-High Definition resolution). For example, the usage category defined to include peripheral device workspaces 320, 340 and 360 may include a single operational telemetry reading indicating that the user of the anchor node 321, 341, or 361 is currently executing a computer code development program, one range of functional capabilities for external display devices, such as 325, 345, and 365 allowing each of these devices 325, 345, and 365 to display at a resolution between 720p and High-Definition (HD), and one adjustable operational configuration configuring each of those devices 325, 345, and 365 to display at an HD resolution. In such an embodiment, any peripheral device workspace that includes an anchor node executing a computer code development program operatively coupled to an external display device having that specific range of display resolutions and configured to display in HD resolution could be assigned to this usage category, for example. One or more of any of the above attributes may be definitive of any usage category in combinations according to some embodiments herein.

In another embodiment herein, the usage category may include a plurality of such attributes. For example, a usage category defined to include peripheral device workspaces 320, 340 and 360 in an embodiment herein may include a plurality of anchor operational telemetry data readings (e.g., a specific application being executed, a specific time of day, and a certain amount of battery power remaining), a plurality of peripheral devices (e.g., an external display device, a mouse, and a keyboard), and for each of these peripheral devices, a range of functional capabilities (e.g., a range of available display resolutions for the display device, a range of polling rates for the mouse, and a range of keystroke or button detection for the keyboard) and a single adjustable operational configuration (e.g., a specific display resolution of 4K Ultra-High Definition resolution, a specific polling rate for the mouse, and a specific keystroke or button detection value for the keyboard). Definition of such usage categories for a given peripheral device workspace in embodiments herein may thus result in identification of other peripheral device workspaces from execution of code instructions for the intelligent peripheral device settings transference module that either belong to the same user or multiple users and that have similar peripheral devices configured in similar ways to support similar workloads or usage patterns at an anchor node for a usage category. Each peripheral device workspace analyzed in such a way by the clustering algorithm of the intelligent peripheral device settings transference module in an embodiment to be associated with a usage category identifier within the definition of that peripheral device workspace, and such a usage category identifier may also be associated with the user of that peripheral device workspace within that user's xID.

Code instructions for the cloud manageability orchestration module may execute at a peripheral device workspace cloud orchestrator server in an embodiment at block 408 to determine, based on receipt of updated peripheral device workspace anchor node status update document, that user associated with user composite peripheral device identifier has moved from a first peripheral device workspace with a first peripheral device workspace identification value to a second peripheral device workspace with a second peripheral device workspace identification value. For example, in an embodiment as described with reference to FIG. 2, above, each time a peripheral device configuration setting is changed by the user of an anchor node 230, a new peripheral device is added to the peripheral device workspace 250, or changes to environmental context data for the peripheral device workspace 250 are detected, a new peripheral device workspace anchor node status update document including this updated configuration may be transmitted to the peripheral device workspace cloud orchestrator executing at the peripheral device workspace cloud orchestrator server. In another example embodiment described with respect to FIG. 3, when a user enters the peripheral device workspace 350 and operatively couples the anchor node 351 to each of the peripheral devices 352, 353, 354, and 355, the anchor node 351 may transmit such a peripheral device workspace anchor node status update document identifying the current peripheral device workspace 350 for the user of the anchor node 351.

At block 410, code instructions for the intelligent peripheral device settings transference module may execute at the peripheral device workspace cloud orchestrator server in an embodiment to determine the usage category for the second peripheral device workspace. A usage category may relate to expected or current usages of an anchor node device within a peripheral device workspace and may be determined, in part, from anticipated or current executing software applications, such as for work, design, gaming, videoconferencing, or the like to be executed in the new, current peripheral device workspace in some embodiments. The usage category is also related to capabilities, configurations, and settings for peripheral device nodes supporting the user's anchor information handling system node in the new, current peripheral device workspace. For example, code instructions of the intelligent peripheral device settings transference module 369 in an embodiment may assign a current peripheral device workspace 350 a previously defined usage category. The new, current peripheral device workspace is correlated with a usage category assigned to peripheral device workspaces 320, 340 and 360 by execution of code instructions of the clustering algorithm of the peripheral device workspace cloud orchestrator 369 using the received peripheral device workspace anchor node status update document identifying the current peripheral device workspace 350 for the user of the anchor node 351. In such an example embodiment, the clustering algorithm may assign the peripheral device workspace 350 to the same usage category as the peripheral device workspaces 320, 340, or 360 is sufficient overlap is determined for it to fall within that usage category. In an embodiment, code instructions of the intelligent peripheral device settings transference module 369 may execute to assign a current peripheral device workspace 350 a previously defined usage category, such as that assigned to peripheral device workspaces 320, 340 and 360, based on similarity overlap between the anchor node workloads, peripheral device types included, range of functional capabilities, and adjustable operational configurations for those peripheral device nodes defining that usage category for the other peripheral device workspaces and the anchor node 351 workloads, peripheral device types included, range of functional capabilities, and adjustable operational configurations for those peripheral device nodes 352, 353, 354, and 355 for the current peripheral device workspace 350.

Code instructions for the intelligent peripheral device settings transference module in an embodiment at block 412 may execute to determine a usage category comparison similarity value for the assigned usage category to the current peripheral device workspace. In some cases, the anchor node 351 workloads, peripheral device types included, range of functional capabilities, and adjustable operational configurations for those peripheral devices 352, 353, 354, and 355 for the current peripheral device workspace 350 may only partially match or overlap these attributes as defining the usage category. For example, the current peripheral device workspace 350 operational telemetry data readings may indicate only a partial match or overlap to the usage category's defining plurality of anchor node 321, 341, and 361 workloads, plurality of peripheral device types included, or range of functional capabilities, and adjustable operational configurations for those peripheral device nodes, such as 322, 323, 324, 325, 326, 342, 343, 344, 345, 346, 362, 363, 364, and 365.

Code instructions for the intelligent peripheral device settings transference module 369 in an embodiment may assign a usage category comparison similarity value to each peripheral device workspace indicating overlap, such as 350 assigned to an existing usage category in such a case. This usage category comparison similarity value in an embodiment may describe a percentage of the total number of anchor node 321, 341, and 351 workloads, peripheral device types included, range of functional capabilities, and adjustable operational configurations for those peripheral devices such as 322, 323, 324, 325, 326, 342, 343, 344, 345, 346, 362, 363, 364, and 365 defining the usage category that are matched by operational telemetry data readings of the current peripheral device workspace 350. In other embodiments, a weighted usage category comparison similarity value in an embodiment may describe a weighted percentage of the total number of anchor node 321, 341, and 351 workloads, peripheral device types included, range of functional capabilities, and adjustable operational configurations for those peripheral devices such as 322, 323, 324, 325, 326, 342, 343, 344, 345, 346, 362, 363, 364, and 365 defining the usage category that are matched or overlapped by operational telemetry data readings of the current peripheral device workspace 350. The weighting may apply to anchor node 321, 341, and 351 workloads, peripheral device types included, range of functional capabilities, and adjustable operational configurations that may have higher impact or importance for a particular usage category in example embodiments. For example, in a gaming application usage context, a high resolution display device or a fast response mouse or keyboard may carry a larger weight in determination of the weighted usage category comparison similarity value in one example embodiment.

In such a way, code instructions for the intelligent peripheral device settings transference module in an embodiment may execute code instructions of a clustering algorithm to group peripheral device workspaces undergoing similar usage patterns between anchor information handling systems and various operatively coupled peripheral devices together. The method of determining a usage category for predicting best adjustable operational configurations for one or more peripheral devices in a given peripheral device workspace based on shared or previously analyzed usage patterns may then end.

Figure 5:
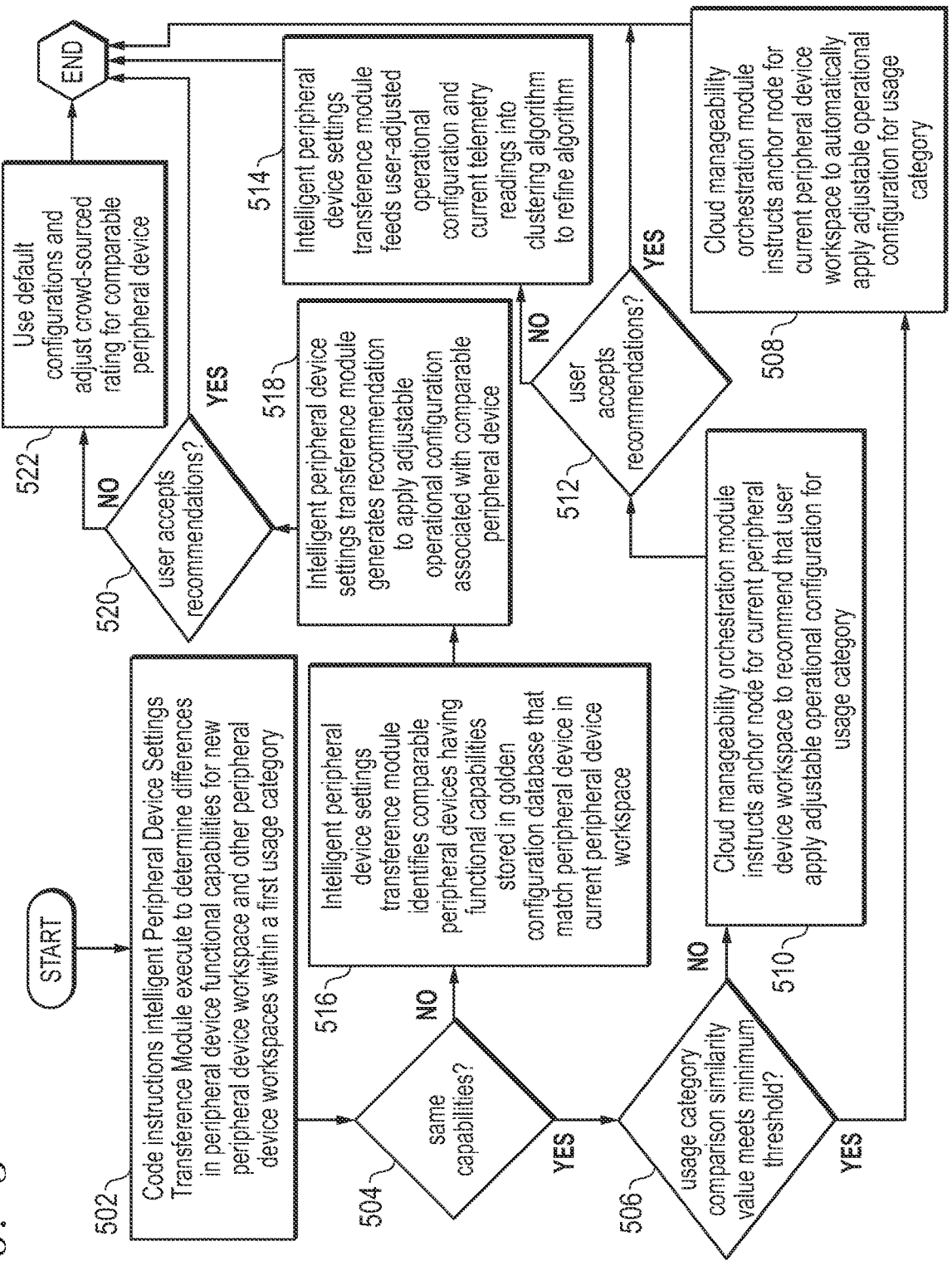
FIG. 5 is a flow diagram illustrating a method of executing code instructions of an intelligent peripheral device setting transference system at a peripheral device workspace cloud orchestrator for determining an adjustable operational configuration best-suited for a given peripheral device node within a current peripheral device workspace having a determined usage pattern according to an embodiment of the present disclosure.

FIG. 5 is a flow diagram illustrating a method of executing code instructions for the intelligent peripheral device settings transference module at a peripheral device workspace cloud orchestrator server for determining and automatically applying or recommending user application of an adjustable operational configuration best-suited for a given peripheral device within a current peripheral device workspace undergoing a known workload or usage pattern according to an embodiment of the present disclosure. As described herein, upon determination of a usage category for the current peripheral device workspace, code instructions for the intelligent peripheral device settings transference module may execute in an embodiment to determine adjustable operational configurations for a usage category of the current peripheral devices in the current peripheral device workspace based on the determined usage pattern.

At block 502, code instructions for the intelligent peripheral device settings transference module may execute to determine differences in peripheral device functional capabilities for a new peripheral device workspace and any other peripheral device workspaces within the same usage category. For example, in an embodiment described with respect to FIG. 3, code instructions for the intelligent peripheral device settings transference module 369 may execute to determine one or more adjustable operational configurations for one or more of the current peripheral devices 352, 353, 354, or 355 in the current peripheral device workspace based on the determined usage category. As described herein, a new or current peripheral device workspace 350 may be assigned to a previously defined usage category, such as the usage category defined to also include one or more peripheral device workspaces 320, 340, and 360, even if the anchor node workloads, peripheral device types included, range of functional capabilities, and adjustable operational configurations for those peripheral devices 352, 353, 354, or 355 for the current peripheral device workspace 350 are not an exact match with the anchor node workloads, peripheral device types included, range of functional capabilities, and adjustable operational configurations for those peripheral devices defining the usage category or as found in peripheral device workspaces 320, 340 and 360 that also fall within the usage category. In such a case, code instructions for the intelligent peripheral device settings transference module 369 may execute to determine differences in peripheral device functional capabilities between the current peripheral device workspace 350 and peripheral device functional capabilities defining a particular usage category.

For example, code instructions for the intelligent peripheral device settings transference module 369 may execute to determine a difference in peripheral device functional capabilities for the mouse 352 for the current peripheral device workspace 350 and at least one of range of possible polling rates, button detection sensitivity levels, or power source levels shared by each of the mice 322, 342, and 362 that define the usage category to include peripheral device workspaces 320, 340 and 360. In another example, code instructions for the intelligent peripheral device settings transference module 369 may execute to determine a difference in peripheral device functional capabilities for the keyboard 353 for the current peripheral device workspace 350 and at least one of a range of possible keypress detection sensitivity levels, status of a background LED, or power source levels shared by each of the keyboards 323, 343, and 363 that define the usage category to include peripheral device workspaces 320, 340 and 360. In yet another example, code instructions for the intelligent peripheral device settings transference module 369 may execute to determine a difference in peripheral device functional capabilities for each of the external display devices 354 and 355 for the current peripheral device workspace 350 and at least one of range of possible display resolution, display refresh rate, brightness, contrast, color gamut, horizontal view angle, vertical view angle, and response time shared by at least one of the external displays 325 or 326, at least one of the external displays 345 or 346, and at least one of the external displays 364 or 365 that define the usage category to include peripheral device workspaces 320, 340 and 360.

Code instructions for the intelligent peripheral device settings transference module in an embodiment may execute at block 504 to determine whether any given peripheral device node within the current peripheral device workspace has an overlapping range of functional capabilities to peripheral device nodes having the same type that define the usage category for the current peripheral device workspace. Configuring a peripheral device having a first range of functional capabilities according to an adjustable operational configuration previously applied to another peripheral device having a second range of functional capabilities may result in a less enjoyable or productive experience for the user when ranges of functional capabilities do not overlap. If the current peripheral device workspace has an identical or overlapping range of functional capabilities to peripheral devices having the same type that define the usage category for the current peripheral device workspace, configuring the current peripheral device according to the corresponding adjustable operational configuration for that peripheral device type that defines the usage category may be appropriate, and the method may proceed to block 506. If the current peripheral device workspace has a different range of functional capabilities than peripheral device nodes having the same type from the usage category for the current peripheral device workspace, the method may proceed to block 516 to configure the current peripheral device workspace according to adjustable operational configurations previously used on peripheral devices having an identical or overlapping range of functional capabilities, as stored within the golden configuration database.

At block 506, code instructions for the intelligent peripheral device settings transference module in an embodiment in which the functional capabilities for a peripheral device within the current peripheral device workspace are identical or overlap to those for the usage category for the current peripheral device workspace may execute to determine whether the usage category comparison similarity value indicating level of overlap for the assigned usage category meets a minimum threshold, such as 80%, 90%, or 95%, for example. As described above with respect to block 412 of FIG. 4, code instructions for the intelligent peripheral device settings transference module may assign a usage category comparison similarity value to each peripheral device workspace describing a percentage of the total number of anchor node workloads, peripheral device types included, range of functional capabilities, and adjustable operational configurations for those peripheral devices such as defining the usage category that are matched or overlapped by operational telemetry data readings of the current peripheral device workspace. The degree to which configuration of the current peripheral device workspace peripheral devices according to the adjustable operational configurations defining the usage category is appropriate may depend in embodiments on the overall similarity between the current peripheral device workspace and the defined usage category. If the usage category comparison similarity value indicating overlap level for the assigned usage category meets the minimum threshold, this may indicate that is appropriate to configure one or more of the current peripheral device workspace peripheral devices according to the adjustable operational configurations defining the usage category, and the method may proceed to block 508 for automatic application of such a configuration. If the usage category comparison similarity value for the assigned usage category does not meet the minimum threshold, this may indicate less overlap and that it may or may not be appropriate to configure one or more of the current peripheral device workspace peripheral devices according to the adjustable operational configurations defining the usage category, and the method may proceed to block 510 for transmission of a recommendation that the user should apply such a configuration. In such a scenario, the user may reject any recommended configurations deemed by the user to be incapable of supporting the workload for the anchor node.

In an embodiment at block 508 in which the usage category comparison similarity value for the assigned usage category meets the minimum threshold, code instructions for the intelligent peripheral device settings transference module may execute to automatically configure the peripheral device(s) within the current peripheral device workspace according to the adjustable operational configurations for those peripheral device having the same peripheral device type given within the definition of the usage category. For example, code instructions for the intelligent peripheral device settings transference module 369 may execute to automatically configure the peripheral device(s), such as 352, 353, 354, or 355 within the current peripheral device workspace 355 according to the adjustable operational configurations for those peripheral device having the same peripheral device type given within the definition of the usage category. More specifically, in an embodiment in which the mouse 352 has a range of functional capabilities that matches or overlaps the range of functional capabilities for mice 322, 342, and 362 defining the assigned usage category for peripheral devices 320, 340, 350, and 360, and in which the usage category comparison similarity value described above meets the minimum threshold, any adjustable operational configurations for the mice 322, 342, and 362 that define the usage category may be automatically applied to the mouse 352. This may be accomplished by code instructions for the intelligent peripheral device settings transference module 369 and a peripheral device workspace management orchestrator executing at a peripheral device workspace cloud orchestrator server 358 instructing the anchor node 351 to apply such an adjustable operational configuration via the ecosystem manageability subagent (e.g., 290 of FIG. 2) of the anchor node 251 and the ecosystem manageability interface (e.g., 252 of FIG. 2) of the mouse 352.

In another example embodiment in which the keyboard 353 has a range of functional capabilities that matches or overlaps the range of functional capabilities for keyboards 323, 343, or 364 defining the assigned usage category for peripheral devices 320, 340, 350, and 360, and in which the usage category comparison similarity value described above meets the minimum threshold, any adjustable operational configurations for the keyboards 323, 343, or 364 that define the usage category may be automatically applied to the keyboard 353. This may be accomplished by code instructions for the intelligent peripheral device settings transference module 369 and a peripheral device workspace management orchestrator executing at a peripheral device workspace cloud orchestrator server 358 instructing the anchor node 351 to apply such an adjustable operational configuration via the ecosystem manageability subagent (e.g., 290 of FIG. 2) of the anchor node 251 and the ecosystem manageability interface (e.g., 252 of FIG. 2) of the keyboard 353.

In yet another example embodiment in which one of the external display device 354 or 355 has a range of functional capabilities that matches the range of functional capabilities for external display devices 325, 326, 345, 346, 364, or 365 defining the assigned usage category for peripheral device nodes 320, 340, 350, and 360, and in which the usage category comparison similarity value described above meets the minimum threshold, any adjustable operational configurations for the external display devices 325, 326, 345, 346, 364, or 365 that define the usage category may be automatically applied to the external display 354 or 355. This may be accomplished by code instructions for the intelligent peripheral device settings transference module 369 and a peripheral device workspace management orchestrator executing at a peripheral device workspace cloud orchestrator server 358 instructing the anchor node 351 to apply such an adjustable operational configuration via the ecosystem manageability subagent (e.g., 290 of FIG. 2) of the anchor node 251 and the ecosystem manageability interface (e.g., 252 of FIG. 2) of the external display 354 or 355. The method may then end.

Returning to block 510 in an embodiment in which the usage category comparison similarity value for the assigned usage category does not meet the minimum threshold, code instructions for the intelligent peripheral device settings transference module and the and a peripheral device workspace management orchestrator executing at a peripheral device workspace cloud orchestrator server may execute to recommend that the user configure the peripheral device(s) within the current peripheral device workspace according to the adjustable operational configurations for those peripheral device having the same peripheral device type given within the definition of the usage category. For example, in an embodiment in which the mouse 352 has a range of functional capabilities that matches the range of functional capabilities for mice 322, 342, and 362 defining the assigned usage category for peripheral devices 320, 340, 350, and 360, but in which the usage category comparison similarity value does not meet the minimum threshold, any adjustable operational configurations for the mice 322, 342, and 362 that define the usage category may be recommended for application to the mouse 352 by the user of the anchor node 351. In another example embodiment in which the keyboard 353 has a range of functional capabilities that matches the range of functional capabilities for keyboards 323, 343, or 364 defining the assigned usage category for peripheral devices 320, 340, 350, and 360, but in which the usage category comparison similarity value does not meet the minimum threshold, any adjustable operational configurations for the keyboards 323, 343, or 364 that define the usage category may be recommended for application to the keyboard 353 by the user of the anchor node 351. In yet another example embodiment in which one of the external display device 354 or 355 has a range of functional capabilities that matches the range of functional capabilities for external display devices 325, 326, 345, 346, 364, or 365 defining the assigned usage category for peripheral devices 320, 340, 350, and 360, but in which the usage category comparison similarity value does not meet the minimum threshold, any adjustable operational configurations for the external display devices 325, 326, 345, 346, 364, or 365 that define the usage category may be recommended for application to the external display 354 or 355 by the user. This may be accomplished by code instructions for the intelligent peripheral device settings transference module 369 and a peripheral device workspace management orchestrator executing at a peripheral device workspace cloud orchestrator server 358 instructing the anchor node 351 to recommend application of such an adjustable operational configuration via the ecosystem manageability subagent (e.g., 290 of FIG. 2) of the anchor node 251 and the ecosystem manageability interface (e.g., 252 of FIG. 2) of the external display 354 or 355.

It may be determined in an embodiment at block 512, via execution of code instructions for the intelligent peripheral device settings transference module, whether the user has accepted the recommendation at block 510 to apply the adjustable operational configuration defining the usage category to one or more peripheral devices within the current peripheral device workspace. If the user does not accept such a recommended adjustable operational configuration, this may indicate that the user does not plan to use the peripheral device in the same way as other users have used similar peripheral devices under similar circumstances in the past, as defining the usage category, and the method may proceed to block 514 for adjustment of the usage category. If the user does accept such a recommended adjustable operational configuration, this may indicate that the user does plan to use the peripheral device in the same way as other users have used similar peripheral devices under similar circumstances in the past, as defining the usage category, and the method may end.

In an embodiment at block 514 in which the user does not accept such a recommended adjustable operational configuration made at block 510, code instructions for the intelligent peripheral device settings transference module may execute to feed a user-adjusted operational configuration and current telemetry data readings for the current peripheral device workspace into the clustering algorithm to refine the algorithm. The clustering algorithm can be refined to more accurately predict the ways in which future users will wish to configure peripheral devices used in similar ways and under similar circumstances by feeding peripheral device operational telemetry data readings describing the usage pattern for the current peripheral device workspace and a user-adjusted operational configuration (e.g., selected by the user instead of the recommended adjustable operational configuration) back into the algorithm. In such a way, the clustering algorithm for the intelligent peripheral device settings transference module may be honed over time to more accurately predict the best operational configuration for a given peripheral device within a peripheral device workspace undergoing a specific usage pattern. The method may then end.

At block 516, in an embodiment in which a given peripheral device within the current peripheral device workspace does not have an identical range of functional capabilities to peripheral devices having the same type that define the usage category for the current peripheral device workspace, code instructions for the intelligent peripheral device settings transference module may execute to identify one or more comparable peripheral devices having functional capabilities stored in the golden configuration database that match those of the given peripheral device in the current peripheral device workspace. In other words, in such an embodiment, it may be more appropriate to configure the given peripheral device for the current peripheral device workspace according to adjustable operational configurations for peripheral devices not associated with the usage category for the current peripheral device workspace, but which have an identical range of functional capabilities as that of the given peripheral device within the current peripheral device workspace. For example, code instructions for the intelligent peripheral device settings transference module 369 may execute to determine significant differences in peripheral device functional capabilities between the current peripheral device workspace 350 and peripheral device functional capabilities defining the usage category. For example, code instructions for the intelligent peripheral device settings transference module 369 may execute to determine a difference in peripheral device functional capabilities for the mouse 352 for the current peripheral device workspace 350 and a range of possible polling rates shared by each of the mice 322, 342, and 362 that define the usage category to include peripheral device workspaces 320, 340 and 360. In another example, code instructions for the intelligent peripheral device settings transference module 369 may execute to determine a difference in peripheral device functional capabilities for the keyboard 353 for the current peripheral device workspace 350 and a range of possible keypress detection sensitivity levels shared by each of the keyboards 323, 343, and 363 that define the usage category to include peripheral device workspaces 320, 340 and 360. In yet another example, code instructions for the intelligent peripheral device settings transference module 369 may execute to determine a difference in peripheral device functional capabilities for each of the external display devices 354 and 355 for the current peripheral device workspace 350 and a range of possible display resolution shared by at least one of the external displays 325 or 326, at least one of the external displays 345 or 346, and at least one of the external displays 364 or 365 that define the usage category to include peripheral device workspaces 320, 340 and 360.

For example, code instructions for the intelligent peripheral device settings transference module 369 may execute to determine a difference in peripheral device functional capabilities for the mouse 352 for the current peripheral device workspace 350 and a range of possible polling rates shared by each of the mice 322, 342, and 362 that define the usage category to include peripheral device workspaces 320, 340 and 360. In another example, code instructions for the intelligent peripheral device settings transference module 369 may execute to determine a difference in peripheral device functional capabilities for the keyboard 353 for the current peripheral device workspace 350 and a range of possible keypress detection sensitivity levels shared by each of the keyboards 323, 343, and 363 that define the usage category to include peripheral device workspaces 320, 340 and 360. In yet another example, code instructions for the intelligent peripheral device settings transference module 369 may execute to determine a difference in peripheral device functional capabilities for each of the external display devices 354 and 355 for the current peripheral device workspace 350 and a range of possible display resolution shared by at least one of the external displays 325 or 326, at least one of the external displays 345 or 346, and at least one of the external displays 364 or 365 that define the usage category to include peripheral device workspaces 320, 340 and 360.

In such cases, it may be more appropriate to consider how other peripheral devices of the same type and having the same functional capabilities have been configured in the past when determining the best adjustable operational configuration for the current peripheral device workspace 350, rather than referencing the adjustable operational configuration defining the usage category. As described herein, the ranges of functional capabilities for peripheral devices may be excerpted from peripheral device workspace anchor node status update documents gathered from a plurality of peripheral devices workspaces over time and stored at a cloud-based golden configuration database 385, along with an identification of the peripheral device, make, model, type, and peripheral device workspace identification value for the peripheral device workspace in which it is included. Code instructions for the intelligent peripheral device settings transference module 369 in an embodiment may access this golden configuration database 385 to identify one or more peripheral devices of the same type as a given peripheral device within the current peripheral device workspace 350 that have ranges of functional capabilities that are identical to one or more of such ranges for the given peripheral device within the current peripheral device workspace.

For example, code instructions for the intelligent peripheral device settings transference module 369 may execute to identify a comparable mouse within the golden configuration database 385 having peripheral device functional capabilities that match the range of functional capabilities for the mouse 352 for the current peripheral device workspace 350. In another example, code instructions for the intelligent peripheral device settings transference module 369 may execute to identify a comparable keyboard within the golden configuration database 385 having peripheral device functional capabilities that match functional capabilities for the keyboard 353 for the current peripheral device workspace 350. In yet another example, code instructions for the intelligent peripheral device settings transference module 369 may execute to identify a comparable external display device within the golden configuration database 385 having peripheral device functional capabilities that match functional capabilities for one or both of the external display devices 354 and 355 for the current peripheral device workspace 350.

Code instructions for the intelligent peripheral device settings transference module in an embodiment may execute at block 518 to recommend that the user apply an adjustable operational configuration associated with the comparable peripheral device to a peripheral device within the current peripheral device workspace. For example, code instructions for the intelligent peripheral device settings transference module 369 in an embodiment may execute to instruct the anchor node 351 to recommend that the user apply an adjustable operational configuration (e.g., default configuration, laboratory-tested best configuration, or crowd-source determined best configuration) associated with the identified comparable mouse identified within the golden configuration database 385 to the mouse 352 in the current peripheral device workspace 350. In another example embodiment, code instructions for the intelligent peripheral device settings transference module 369 in an embodiment may execute to instruct the anchor node 351 to recommend that the user apply an adjustable operational configuration associated with the identified comparable keyboard identified within the golden configuration database 385 to the keyboard 353 in the current peripheral device workspace 350. In yet another example embodiment, code instructions for the intelligent peripheral device settings transference module 369 in an embodiment may execute to instruct the anchor node 351 to recommend that the user apply an adjustable operational configuration associated with the identified comparable external display device identified within the golden configuration database 385 to the display device 354 or 355 in the current peripheral device workspace 350.

At block 520 in an embodiment code instructions for the intelligent peripheral device settings transference module may execute to determine whether the user has accepted the recommendation made at block 518. If the user does not accept such a recommended adjustable operational configuration, this may indicate that the user does not plan to use the peripheral device in the same way as other users have used the comparable peripheral device identified within the golden configuration database, and the method may proceed to block 522 for adjustment of the crowd-sourced best rated configuration for that comparable peripheral device. If the user does accept such a recommended adjustable operational configuration, this may indicate that the user does plan to use the peripheral device in the same way as other users have used the comparable peripheral device identified within the golden configuration database, and the method may end.

In an embodiment at block 522 in which the user does not accept a recommended adjustable operational configuration made at block 520, code instructions for the intelligent peripheral device settings transference module may execute to adjust the crowd-sourced best rated configuration may be adjusted based on this received user feedback. In such a way, code instructions for the intelligent peripheral device settings transference module may accurately predict the best operational configuration for a given peripheral device within a peripheral device workspace undergoing a specific usage pattern, and may either automatically institute such a configuration, or recommend that the user do so. The method for determining and automatically applying or recommending user application of an adjustable operational configuration best-suited for a given peripheral device within a current peripheral device workspace undergoing a known workload or usage pattern may then end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device workspace cloud orchestrator executing at a cloud-based information handling system comprising:

a network interface device to receive a plurality of current peripheral device operational telemetry data readings for an information handling system node and a plurality of peripheral device nodes operatively coupled at a first identified location forming a defined current peripheral device workspace identified by a peripheral device workspace identification value;

a hardware processor to execute code instructions for a clustering algorithm of the peripheral device workspace cloud orchestrator to determine a usage category defined by at least a portion of a previous manifest of previous peripheral devices within a previous peripheral device workspace with a previous peripheral device operational telemetry reading, and at least one previous functional capability and at least one previous adjustable operational configuration of a comparable, previous peripheral device in the previous peripheral device workspace;

the hardware processor to execute code instructions to determine a first current peripheral device functional capability for a first peripheral device in the current peripheral device workspace matches the at least one previous functional capability; and the hardware processor to execute code instructions to instruct the anchor node to automatically configure the first peripheral device in the current peripheral device workspace according to the at least one previous adjustable operational configuration defined in the usage category.

2. The peripheral device workspace cloud orchestrator executing at the cloud-based information handling system of claim 1, wherein the clustering algorithm is a K Nearest Neighbor (KNN) clustering algorithm.

3. The peripheral device workspace cloud orchestrator executing at the cloud-based information handling system of claim 1 further comprising:

the hardware processor to determine that a usage category comparison value for the current peripheral device workspace, determined based on overlap levels between the current peripheral device operational telemetry data readings and the previous peripheral device operational telemetry data readings, and between a plurality of current peripheral device functional capabilities for the current peripheral device workspace and the at least one previous functional capability defining the usage category meets a minimum threshold overlap level.

4. The peripheral device workspace cloud orchestrator executing at the cloud-based information handling system of claim 1 further comprising:

the hardware processor to execute code instructions to determine a second current peripheral device functional capability for a second peripheral device type in the current peripheral device workspace does not match any of a plurality of previous peripheral device functional capabilities defined the usage category; and the hardware processor to execute code instructions to instruct the anchor node to recommend that the user configure the second peripheral device according to a stored default configuration for the second peripheral device type.

5. The peripheral device workspace cloud orchestrator executing at the cloud-based information handling system of claim 1 further comprising:

the hardware processor to execute code instructions to determine a second current peripheral device functional capability for a second peripheral device type in the current peripheral device workspace does not match any of a plurality of previous peripheral device functional capabilities defined in the usage category; and the hardware processor to execute code instructions to instruct the anchor node to recommend that the user configure the second peripheral device according to a stored configuration associated with a highest laboratory-tested performance rating for the second peripheral device type.

6. The peripheral device workspace cloud orchestrator executing at the cloud-based information handling system of claim 1 further comprising:

the hardware processor to execute code instructions to determine a second current peripheral device functional capability for a second peripheral device type in the current peripheral device workspace does not match any of a plurality of previous peripheral device functional capabilities defined in the usage category; and the hardware processor to execute code instructions to instruct the anchor node to recommend that the user configure the second peripheral device according to a stored configuration associated with a highest crowd-sourced configuration rating for the second peripheral device type.

7. The peripheral device workspace cloud orchestrator executing at the cloud-based information handling system of claim 1, wherein the first identified location for the current peripheral device workspace is separate from a second identified location defining the previous peripheral device workspace.

8. The peripheral device workspace cloud orchestrator executing at the cloud-based information handling system of claim 1, wherein the first current peripheral device functional capability for the first peripheral device in the current peripheral device workspace is a peripheral device functional capability range that matches the at least one previous functional capability that is a previous peripheral device functional capability range.

9. A method of intelligent peripheral device settings transference comprising:
receiving, via a network interface device, a plurality of peripheral device operational telemetry data readings and plurality of current peripheral device functional capabilities for an anchor information handling system and a plurality of peripheral devices operatively coupled at an identified location to form a defined current peripheral device workspace identified by a peripheral device workspace identification value;
determining, via a hardware processor executing code instructions, a usage category describing a usage pattern defined by at least a portion of a previous manifest of previous peripheral devices within a previous peripheral device workspace with previous peripheral device operational telemetry readings, a plurality of previous device functional capabilities, and at least one previous adjustable operational configuration of a comparable previous peripheral device;
determining, via the hardware processor executing code instructions that a first current peripheral device functional capability for a first peripheral device in the current peripheral device workspace does not match any of a plurality of previous peripheral device functional capabilities defined in the usage category; and
transmitting a recommendation, via the network interface device, to the anchor node that the user configure the first peripheral device according to a stored configuration associated with a first peripheral device type for the first peripheral device.

10. The method of claim 9 further comprising:
determining, via the hardware processor, that a second stored current peripheral device functional capability for a second peripheral device in the current peripheral device workspace matches the at least one previous functional capability; and
instructing the anchor node to automatically configure the second peripheral device according to the at least one previous adjustable operational configuration defined in the usage category.

11. The method of claim 9, wherein the clustering algorithm is a hierarchical-based clustering algorithm.

12. The method of claim 9 further comprising:
receiving, via the network interface device, an indication of user rejection of the recommendation; and
transmitting instructions to the anchor information handling system node to use a default configuration for the first peripheral device.

13. The method of claim 9, wherein the stored configuration associated with the first peripheral device type is a highest crowd-sourced configuration rating for the first peripheral device type.

14. The method of claim 9, wherein the stored configuration associated with the first peripheral device type is also associated with a highest laboratory-tested performance rating for the first peripheral device type.

15. A peripheral device workspace cloud orchestrator executing at a cloud-based information handling system comprising:
a network interface device to receive a plurality of current peripheral device functional capabilities for the current peripheral device workspace for an anchor information handling system node and a plurality of peripheral devices operatively coupled at a first identified location to form a defined current peripheral device workspace identified by a peripheral device workspace identification value;
a hardware processor to execute code instructions for a clustering algorithm of the peripheral device workspace cloud orchestrator to determine a usage category defined by at least a portion of a previous manifest of previous peripheral devices within a previous peripheral device workspace, and at least one previous functional capability and at least one previous adjustable operational configuration of a comparable one of the previous peripheral devices in the previous peripheral device workspace;
the hardware processor to execute code instructions to determine a first current peripheral device functional capability for a first peripheral device in the current peripheral device workspace matches the at least one previous functional capability;
the hardware processor to determine a usage category comparison value for the current peripheral device workspace that is determined based on an overlap level between the plurality of current peripheral device functional capabilities for the current peripheral device workspace and the at least one previous functional capability defined in the usage category meeting a minimum threshold overlap level; and
the hardware processor to execute code instructions to instruct the anchor node to automatically configure the first peripheral device in the current peripheral device workspace according to the at least one previous adjustable operational configuration defined in the usage category.

16. The peripheral device workspace cloud orchestrator executing at the cloud-based information handling system of claim 15, wherein the first current peripheral device functional capability for the first peripheral device in the current peripheral device workspace is a peripheral device functional capability range that matches the at least one previous functional capability that is a previous peripheral device functional capability range.

17. The peripheral device workspace cloud orchestrator executing at the cloud-based information handling system of claim 15, wherein the clustering algorithm is a distribution-based clustering algorithm.

18. The peripheral device workspace cloud orchestrator executing at the cloud-based information handling system of claim 15, wherein the clustering algorithm is a density-based clustering algorithm.

19. The peripheral device workspace cloud orchestrator executing at the cloud-based information handling system of claim 15 further comprising:

the hardware processor to determine a usage category comparison value for the current peripheral device workspace that is determined based on the overlap level between a plurality of current peripheral device functional capabilities for the current peripheral device workspace and the at least one previous functional capability defined in the usage category does not meet a minimum threshold overlap level; and the network interface device to transmit a recommendation to the anchor node that the user configure the first peripheral device according to a stored configuration associated with a peripheral device type for the first peripheral device.

20. The peripheral device workspace cloud orchestrator executing at the cloud-based information handling system of claim 19 further comprising:

the network interface device to receive an indication that the user did not accept the recommendation, and a peripheral device workspace anchor node status update document indicating a user-adjusted operational configuration selected by the user instead of the recommendation; and the hardware processor executing code instructions to determine an updated usage category for the current peripheral device workspace based on analysis of updated peripheral device operational telemetry data readings from the peripheral device workspace anchor node status update document by the clustering algorithm.

\* \* \* \* \*